Feb. 14, 1956  R. C. QUARMBY  2,734,191
NAIL DISTRIBUTORS

Filed Nov. 21, 1952  17 Sheets-Sheet 1

Inventor
Robert C. Quarmby
By his Attorney

Feb. 14, 1956  R. C. QUARMBY  2,734,191
NAIL DISTRIBUTORS
Filed Nov. 21, 1952  17 Sheets-Sheet 2

Inventor
Robert C. Quarmby
By his Attorney

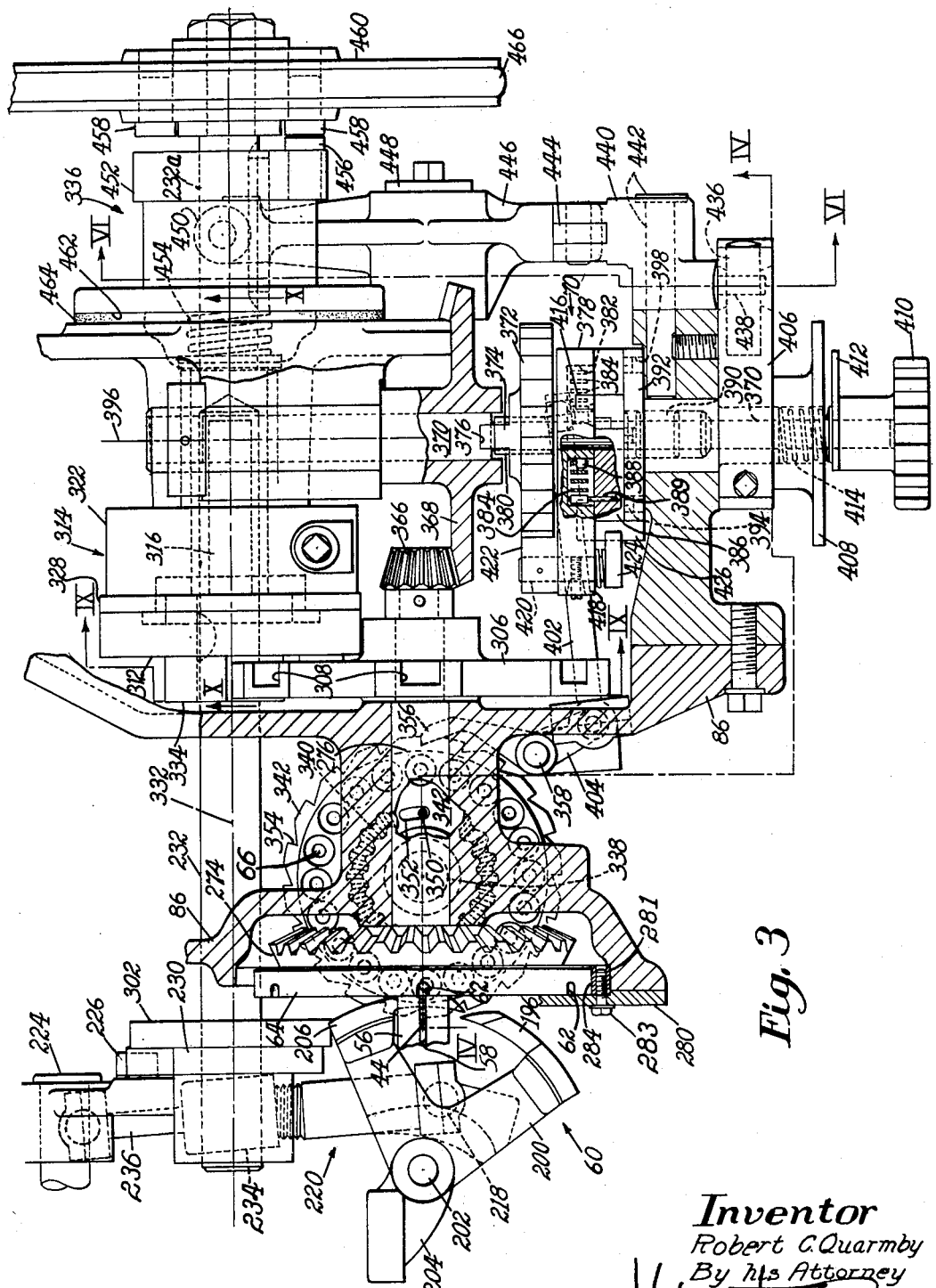

Feb. 14, 1956 R. C. QUARMBY 2,734,191
NAIL DISTRIBUTORS
Filed Nov. 21, 1952 17 Sheets-Sheet 4
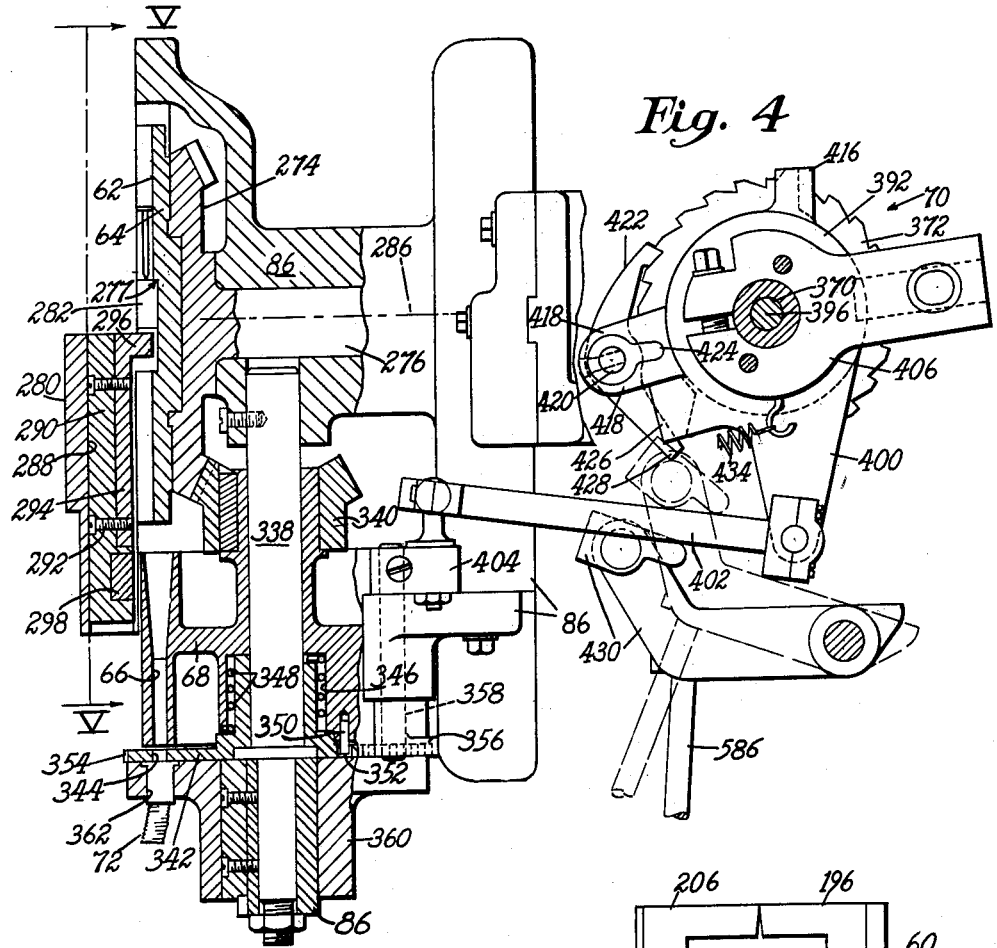
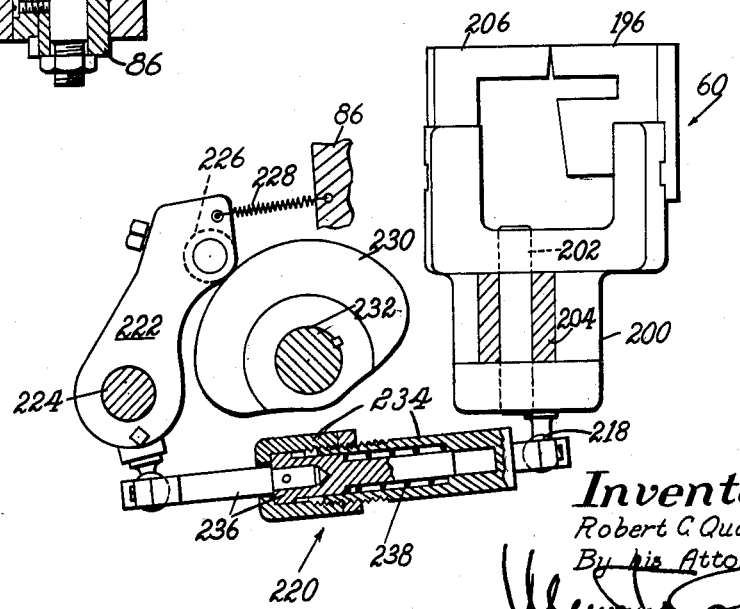
Inventor
Robert C Quarmby
By his Attorney Feb. 14, 1956 R. C. QUARMBY 2,734,191
NAIL DISTRIBUTORS
Filed Nov. 21, 1952 17 Sheets-Sheet 5

Inventor
Robert C. Quarmby
By his Attorney

Feb. 14, 1956 R. C. QUARMBY 2,734,191
NAIL DISTRIBUTORS

Filed Nov. 21, 1952 17 Sheets-Sheet 6

Inventor
Robert C. Quarmby
By his Attorney

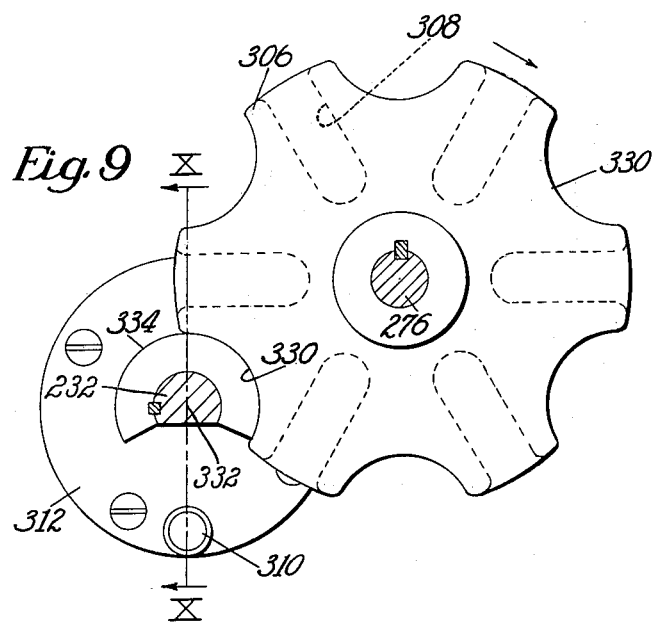
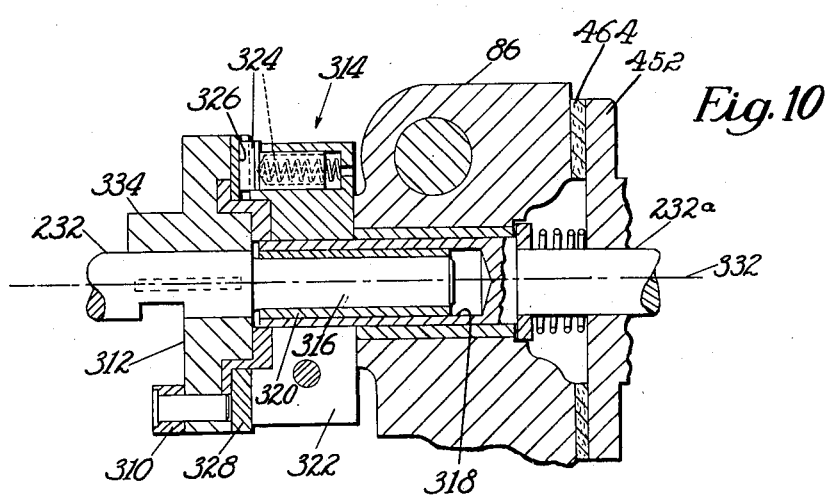

Feb. 14, 1956  R. C. QUARMBY  2,734,191
NAIL DISTRIBUTORS

Filed Nov. 21, 1952  17 Sheets-Sheet 8

Inventor
Robert C. Quarmby
By his Attorney

Feb. 14, 1956  R. C. QUARMBY  2,734,191
NAIL DISTRIBUTORS

Filed Nov. 21, 1952  17 Sheets-Sheet 10

Inventor
Robert C. Quarmby
By his Attorney

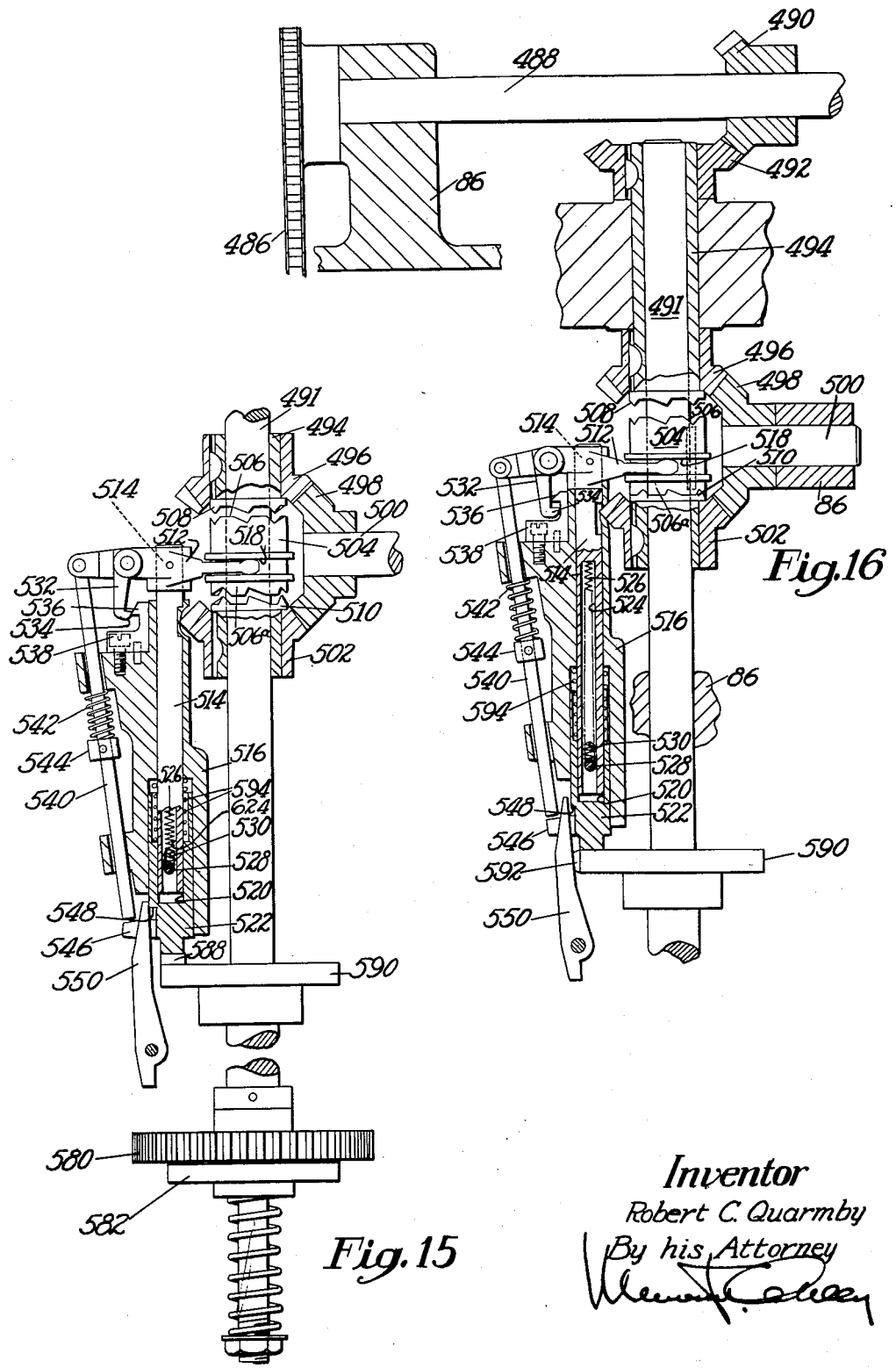

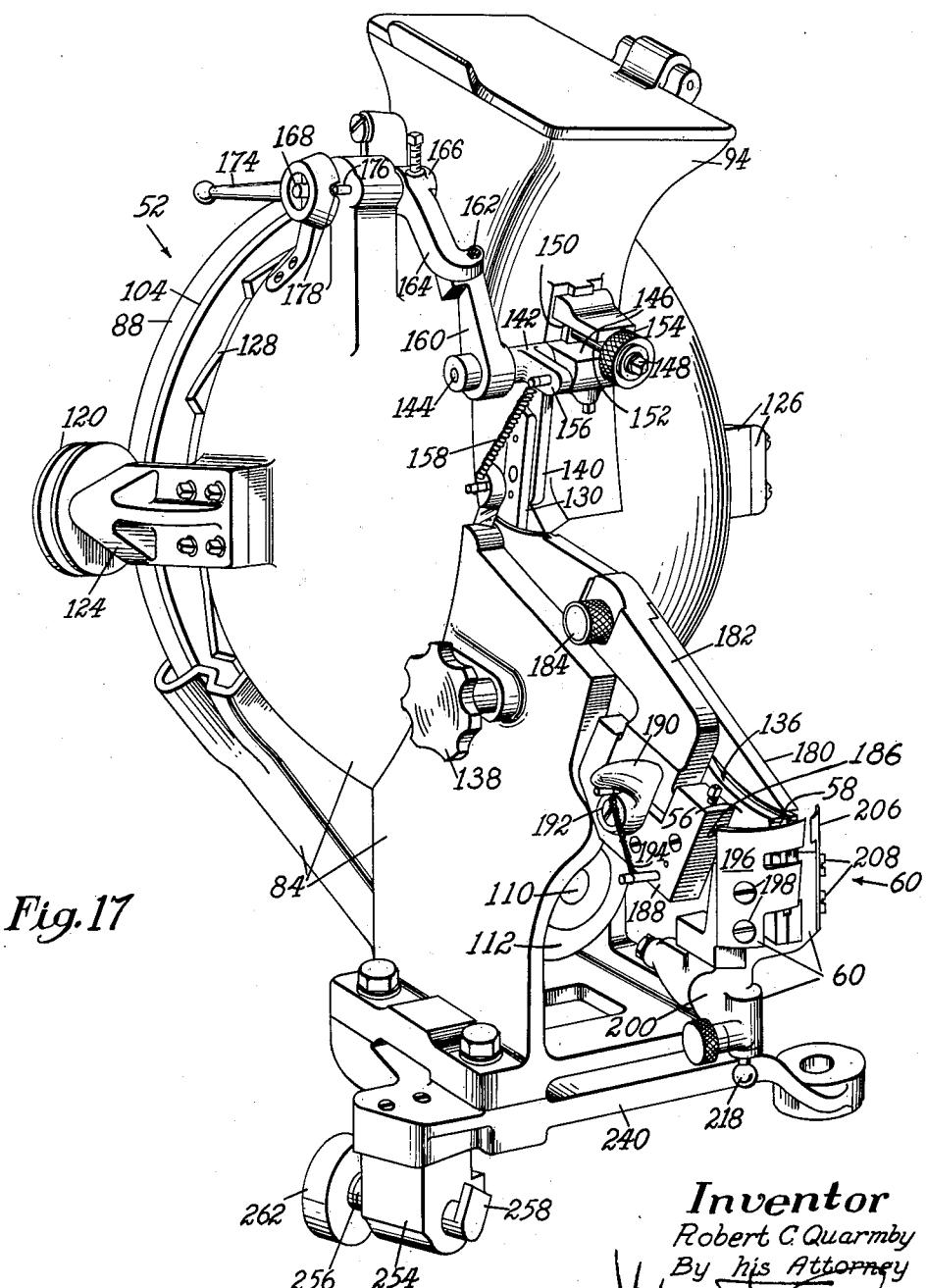

Feb. 14, 1956  R. C. QUARMBY  2,734,191
NAIL DISTRIBUTORS

Filed Nov. 21, 1952  17 Sheets-Sheet 13

Fig.18

Inventor
Robert C. Quarmby
By his Attorney

Feb. 14, 1956 R. C. QUARMBY 2,734,191
NAIL DISTRIBUTORS
Filed Nov. 21, 1952 17 Sheets-Sheet 14

Inventor
Robert C. Quarmby
By his Attorney

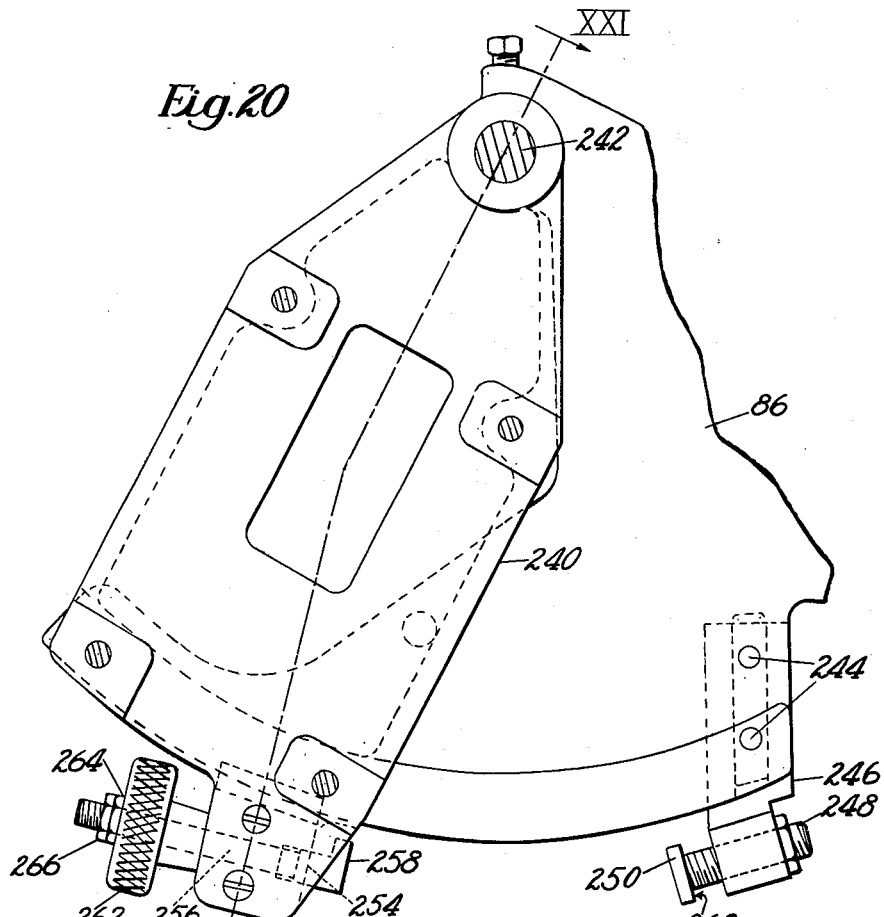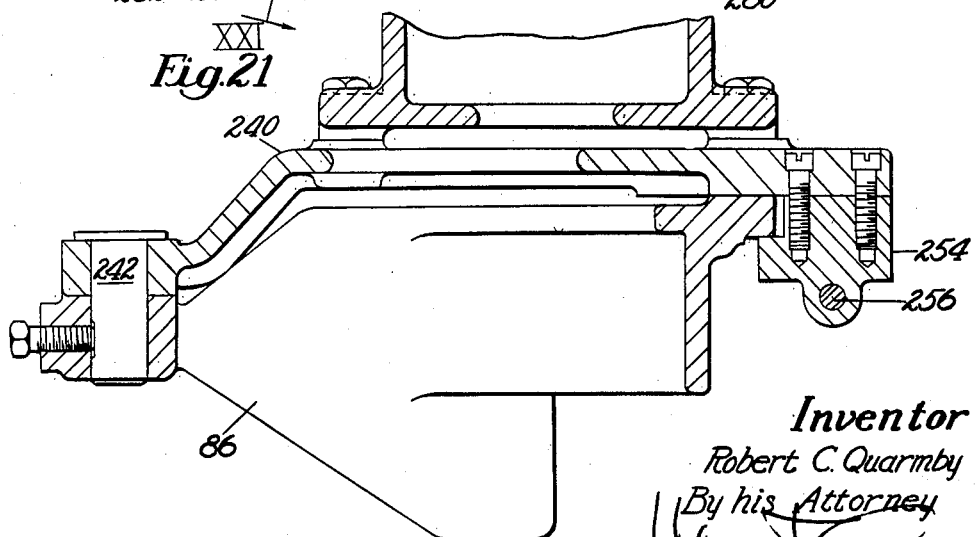

Feb. 14, 1956   R. C. QUARMBY   2,734,191
NAIL DISTRIBUTORS
Filed Nov. 21, 1952   17 Sheets-Sheet 16

Inventor
Robert C. Quarmby
By his Attorney

Feb. 14, 1956    R. C. QUARMBY    2,734,191
NAIL DISTRIBUTORS
Filed Nov. 21, 1952    17 Sheets-Sheet 17
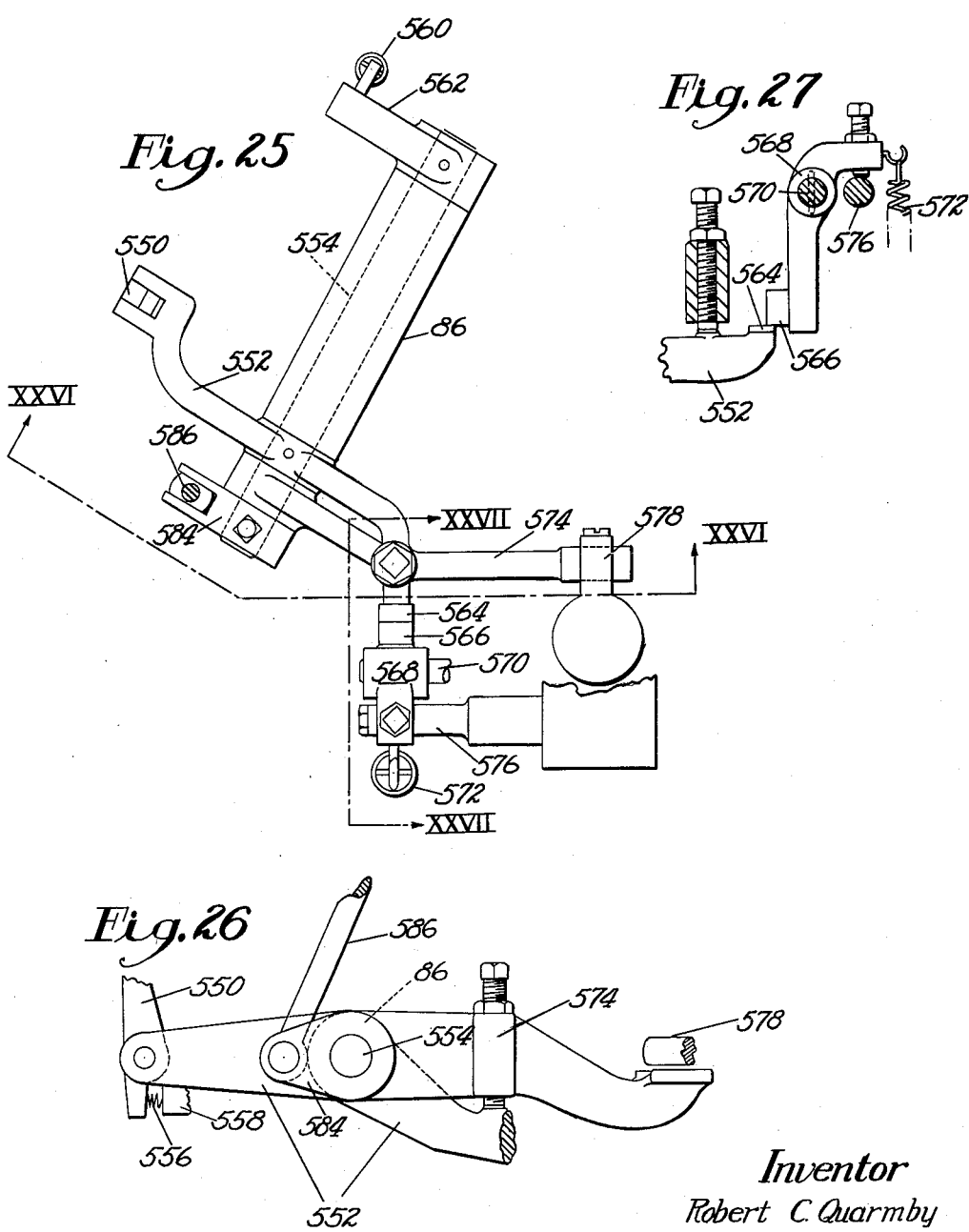

United States Patent Office 2,734,191
Patented Feb. 14, 1956

2,734,191
NAIL DISTRIBUTORS

Robert Charles Quarmby, Leicester, England, assignor to United Shoe Machinery Corporation, Flemington, N. J., a corporation of New Jersey Application November 21, 1952, Serial No. 321,771

Claims priority, application Great Britain December 8, 1951

11 Claims. (Cl. 1—39.1)

This invention relates to nail distributors or loaders and is illustrated as embodied in a distributor for use in a heel attaching machine, it being an object of the invention to produce an improved nail distributor of the general type disclosed in United States Letters Patent No. 1,953,250, granted April 3, 1934, on an application filed in the name of Wilfrid T. Minett.

The present invention consists in the novel features hereinafter described, reference being had to the accompanying drawings which illustrate one embodiment of the same selected for purposes of illustration, said invention being fully disclosed in the following description and claims.

In the drawings,

Fig. 3 is a plan view, partly in section on the line III—III of Fig. 2, showing in detail portions of the nail delivering and counting mechanism;

Fig. 4 is a front elevation, partly in section on the line IV—IV of Fig. 3, showing in detail portions of said nail delivering and counting mechanism;

Fig. 8 is a side elevation, partly in section on the line VIII—VIII of Fig. 2, of the escapement unit and mechanism for operating it;

Fig. 9 is a side elevation on the line IX—IX of Fig. 3 showing a Geneva gear and an actuating and controlling disk forming part of the nail delivering mechanism of the nail distributor;

Fig. 10 is a section on the line X—X of Figs. 3 and 9 showing slip drive mechanism for a Geneva gear.

Fig. 15 is a view partly in side elevation and partly in section showing driving means for the nail transferring mechanism including a clutch which is in a neutral or open position;

Fig. 16 is a view similar to Fig. 15 but showing the clutch engaged;

Fig. 17 is a perspective view of a nail hopper, nail guiding means comprising said raceway, and the escapement unit for transferring the nails from the raceway to an inverting disk of the machine;

Fig. 18 is a perspective view, somewhat similar to Fig. 17, but showing a funnel of the hopper after it has been swung to a raised open position exposing the upper end of the raceway and the interior of the hopper;

Fig. 20 is a view similar to Fig. 19 but showing the hopper swung forward to an inactive position;

Fig. 21 is a section on the line XXI—XXI of Fig. 20;

Fig. 25 is a plan view of mechanism for controlling the starting of the nail delivering and counting mechanism of the distributor;

Fig. 26 is a side view of some of the parts shown in Fig. 25 on the XXVI—XXVI of Fig. 25;

Fig. 27 is an elevation on the line XXVII—XXVII of Fig. 25; and

Figure 28:
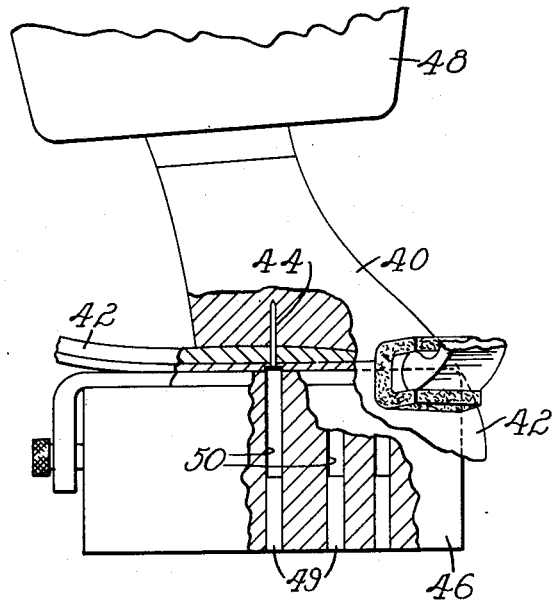
Fig. 28 shows partly in side elevation and partly in section a shoe upon a nailing die of the machine after the attachment of a heel to the shoe.

The illustrative nail distributor is described as embodied in a machine 38 (Fig. 1) which is adapted to attach heels 40 (Fig. 28) to shoes 42 by the use of nails 44 driven from the insides of the shoes and comprises a nailing die 46 upon which the shoes are supported, heel seats uppermost, and a clamp 48 for forcing the heels against the heel seats of the shoes preparatory to raising drivers 49 reciprocable in nail passages 50 of the nailing die to drive said nails, which are delivered by the distributor to said passages, through the heel seat portions of the shoes and into the heels.

Figure 1:
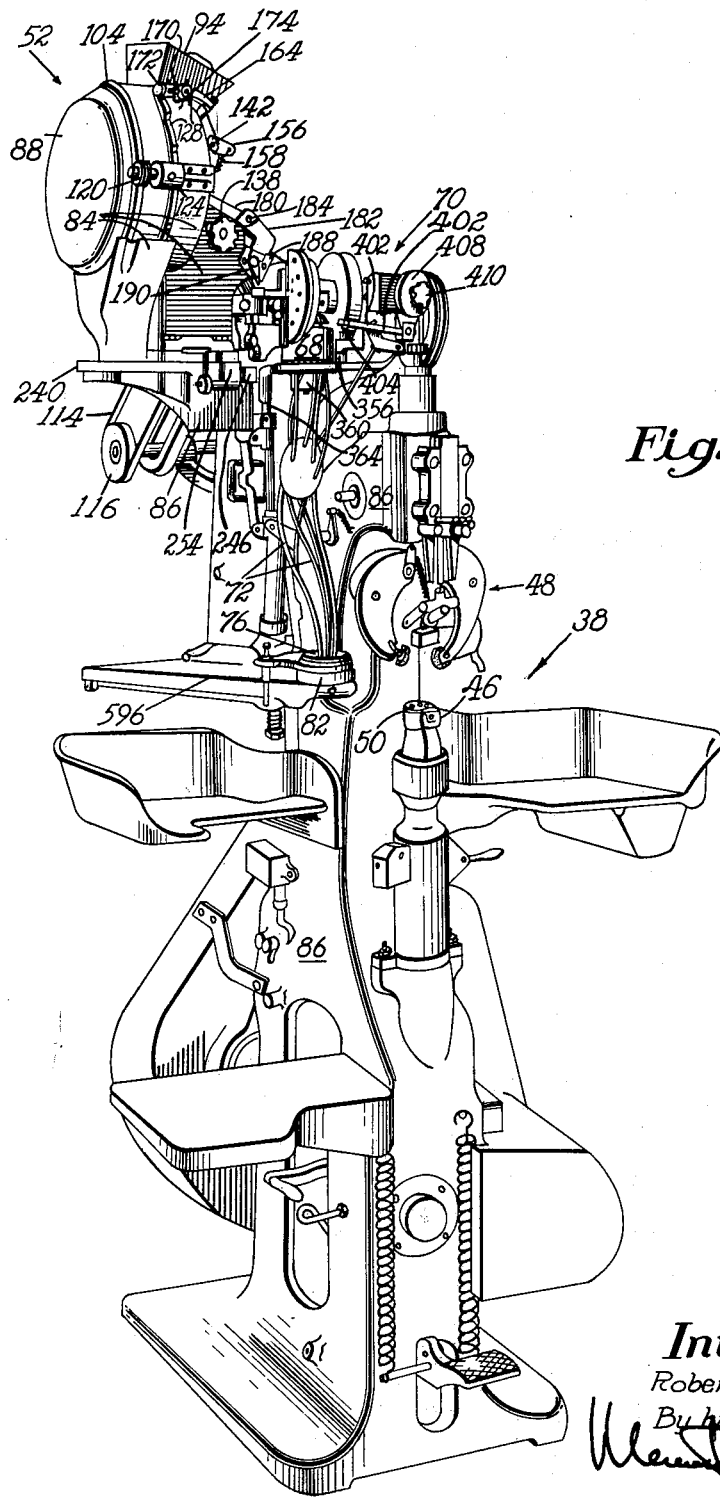
Fig. 1 is a perspective view of a heel attaching machine which is similar to the machine disclosed in said Letters Patent No. 1,953,250 and has associated with it the illustrative nail distributor or loader.
Figure 2:
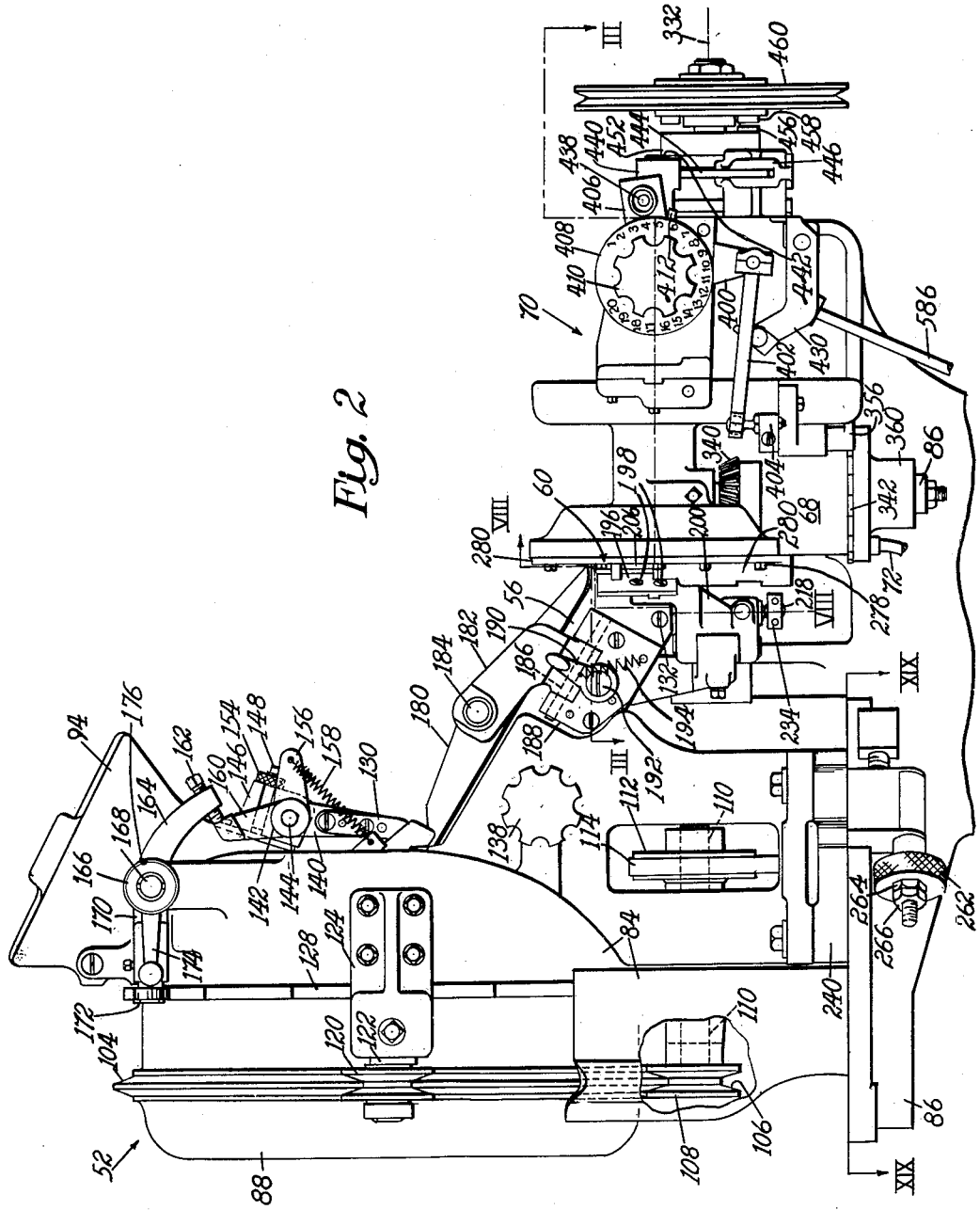
Fig. 2 shows, on an enlarged scale and in front elevation, portions of nail sorting, delivering and counting mechanism of the loader.
Figure 13:
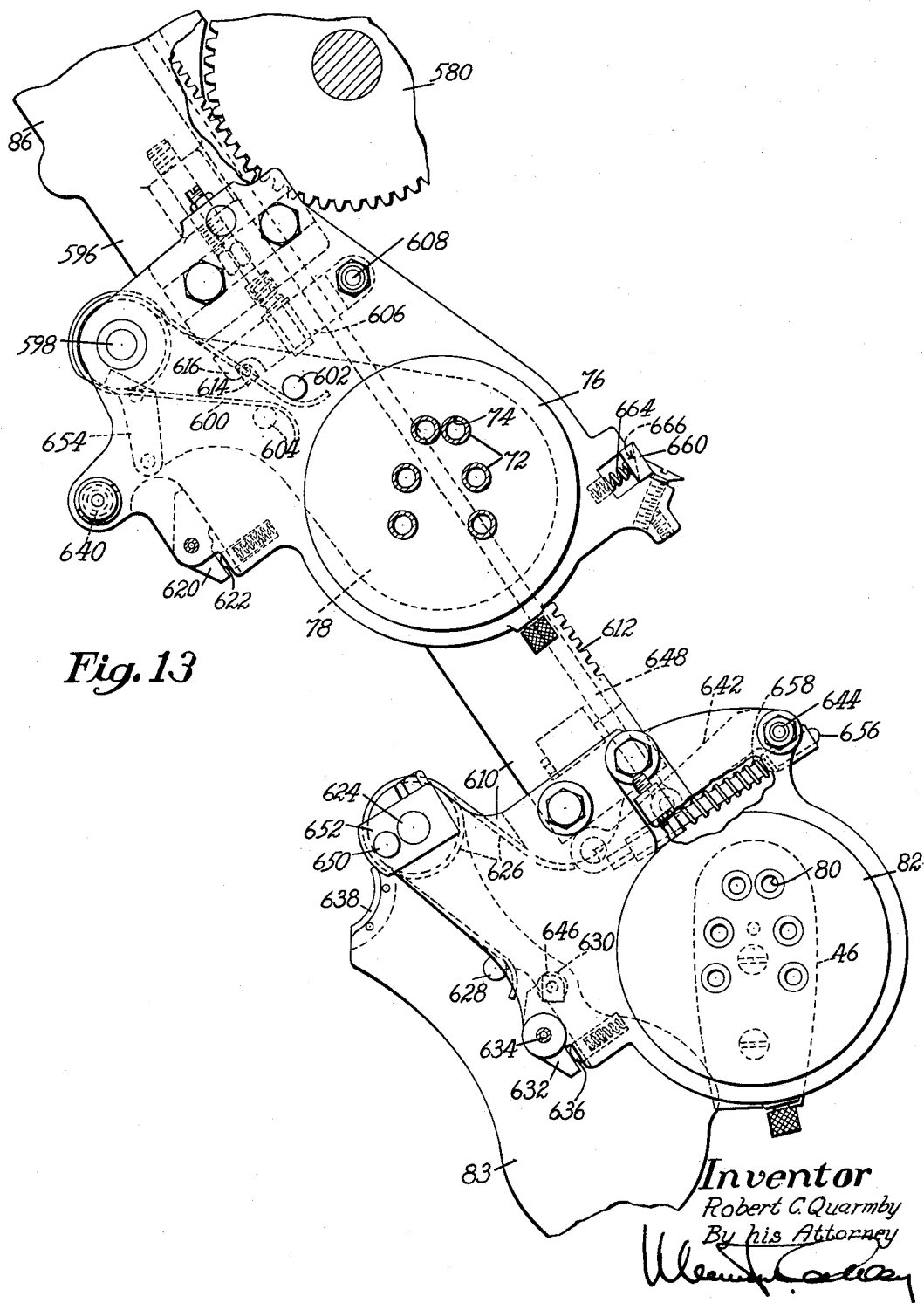
Fig. 13 is a plan view of the nail transferring mechanism the parts of which are in their positions shown in Fig. 12.

Loose nails 44 dumped into a nail hopper 52 (Figs. 1, 2, 17 and 18) are lifted by scoops 54 from the bottom of the hopper and are spilled onto the upper end of a raceway 56 having a nail receiving slot 58 through which the nails hang by their heads and down which the nails travel by the action of gravity. Positioned at the lower end of the raceway 56 is an escapement unit 60 which controls the travel of the nails 44 down the raceway and positively feeds nails one by one into grooves or pockets 62 (Figs. 3, 4 and 5) formed in a nail reversing disk 64 which delivers the nails heads down into vertically disposed passages or holes 66 of a nail distributor block 68 (Figs. 1, 2 and 4). A plurality of nails 44, which may range from two to twenty and are used in the attachment of the heel 40 to the shoe 42 and the number of which may vary in accordance with the setting of counting mechanism 70, are automatically delivered to the nail distributor block 68 during each cycle of the nail distributor, the nails in said block thereafter being automatically delivered simultaneously by tubes 72 to passages 74 (Figs. 13 and 14) of a foot plate 76. The nails 44 in the foot plate 76 and resting upon a shutter 78 are then delivered to passages 80 of a loader block 82 which has associated with it a shutter 83 and is reciprocable forward and rearward of the machine and transfers the nails received from the foot plate to the passages 50 of the nailing die 46.

As will be hereinafter explained, nail distributing mechanism which comprises the escapement unit 60, the reversing disk 64 and the nail distributor block 68, the counting mechanism 70 and the nail transferring mechanism which comprises the loader block 82, are operated in timed relation with the heel attaching instrumentalities of the heel attaching machine, the construction and arrangement being such that the nails are being delivered to the foot plate 76 while the operator is removing the preceding shoe from and is presenting the shoe to be operated upon to the machine, the nails being delivered from the loader block 82 to the nailing die 46 just after the shoe has been removed from the nailing die.

The hopper 52 comprises a fixed portion forming part of a hopper bracket 84, which is supported by and is pivoted for adjustment with relation to a main frame 86 of the machine, and a rotatable drum or drum portion 88, said portions of the hopper forming between them a chamber 90 (Fig. 18) into which the nails in bulk are dumped through an opening 92 in a nail receiving funnel 94 having secured to it a fulcrum pin 96 rotatable in a bore in the hopper bracket 84 so that the funnel may be swung to an inactive position shown in Fig. 18, thereby affording access to said chamber. The funnel 94 may be locked in its closed position shown in Fig. 17 by a screw 98 (Fig. 18) threaded into a lug 100 of the lower end of the funnel 94, said screw being threaded through a block 102 pivotally mounted on the raceway 56. When the screw 98 is turned out of its threaded relation in the lug 100 it may be swung, with the block 102, out of the way of the funnel 94 so that said funnel may be swung upward to its position shown in Fig. 18.

Figure 24:
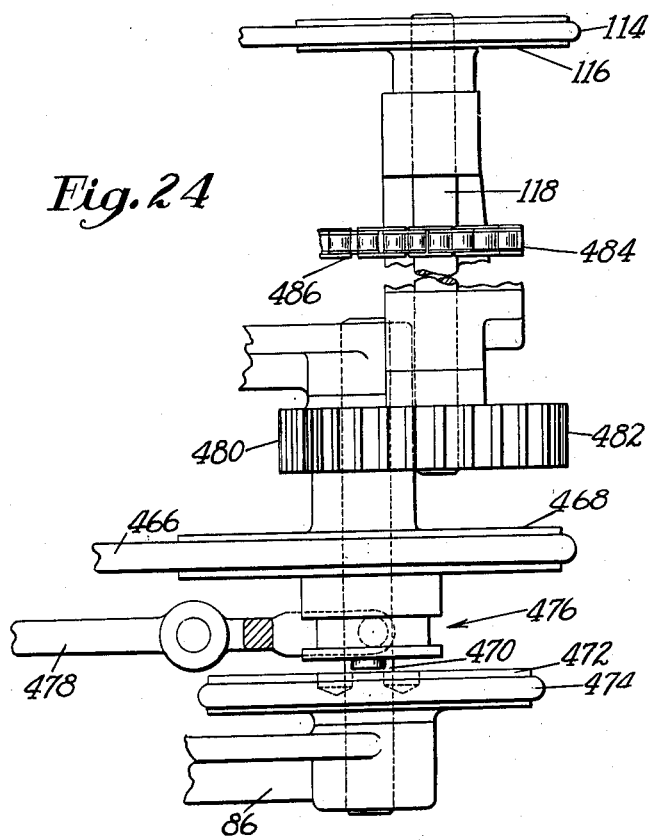
Fig. 24 is a plan view of the drive mechanism shown in Fig. 23.
Figure 23:
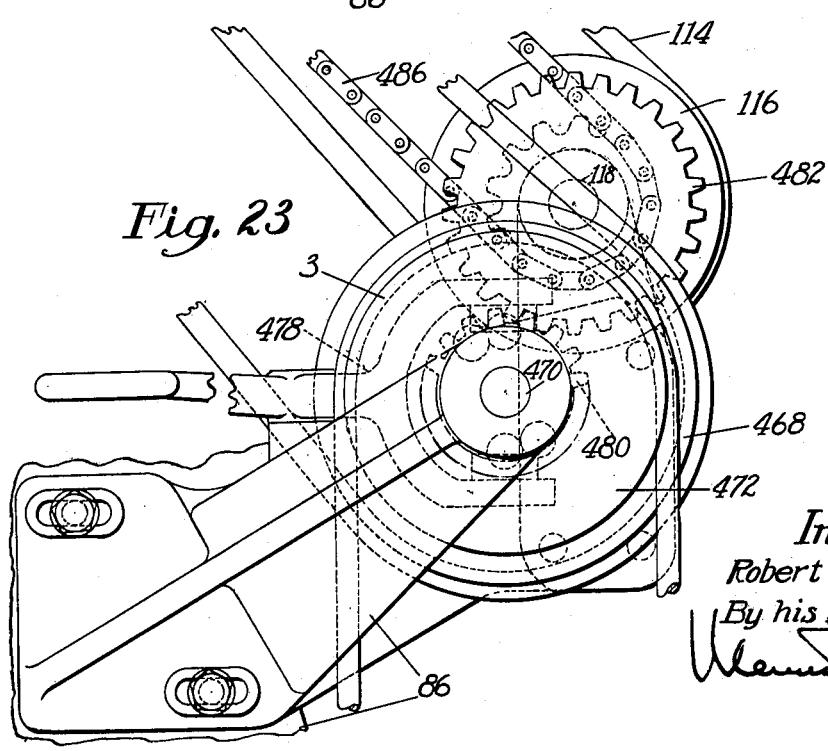
Fig. 23 is an end view of the driving mechanism of the distributor.

The drum portion 88 of the hopper 52 has formed around the inside of it a plurality of circumferentially spaced scoops 54 arranged to pick up the nails 44 from the bottom of the chamber 90 in the hopper and to drop them onto the upper end of the raceway 56. The drum portion 88 of the hopper 52 has extending around it a V-shaped rib 104 which fits in a V-shaped groove 106 (Fig. 2) of a roll 108 secured to a shaft 110 rotatably mounted in the hopper bracket 84. Secured to the right end of the shaft 110, as viewed in Fig. 2, is a pulley 112 which is driven by a belt 114 (Figs. 2, 23 and 24) operatively connected to a pulley 116 secured to a countershaft 118. Located at opposite sides of the drum portion 88 of the hopper 52 are grooved rolls 120 (Figs. 1, 2 and 17), 120a (Fig. 18) for supporting said drum portion against forward and rearward displacement on the roll 108, the roll 120 being rotatably mounted on a horizontal pin 122 secured to a block 124 screwed to the hopper bracket 84, and the roll 120a being rotatably mounted upon an eccentric portion of a second pin (not shown) secured to a block 126 screwed to said hopper bracket. By rotating said second pin the roll 120a may be adjusted toward or away from the roll 120 so that the V-shaped rib 104 on the drum portion 88 of the hopper 52 engages effectively in the grooves of the rolls 108, 120, 120a and said drum portion is properly positioned with relation to the hopper bracket 84. The rolls 108, 120, 120a may be adjusted lengthwise of their axes of rotation so that the drum portion 88 of the nail hopper may be adjusted axially just into engagement with the hopper bracket 84. The drum portion 88 of the hopper 52 may be removed by merely lifting it away from the rolls 108, 120 and 120a. As will be hereinafter explained, the drum portion 88 of the hopper 52 has secured to it a plurality of cams 128 to which mechanism for actuating a raceway clearer 130 is operatively connected.

Figure 7:
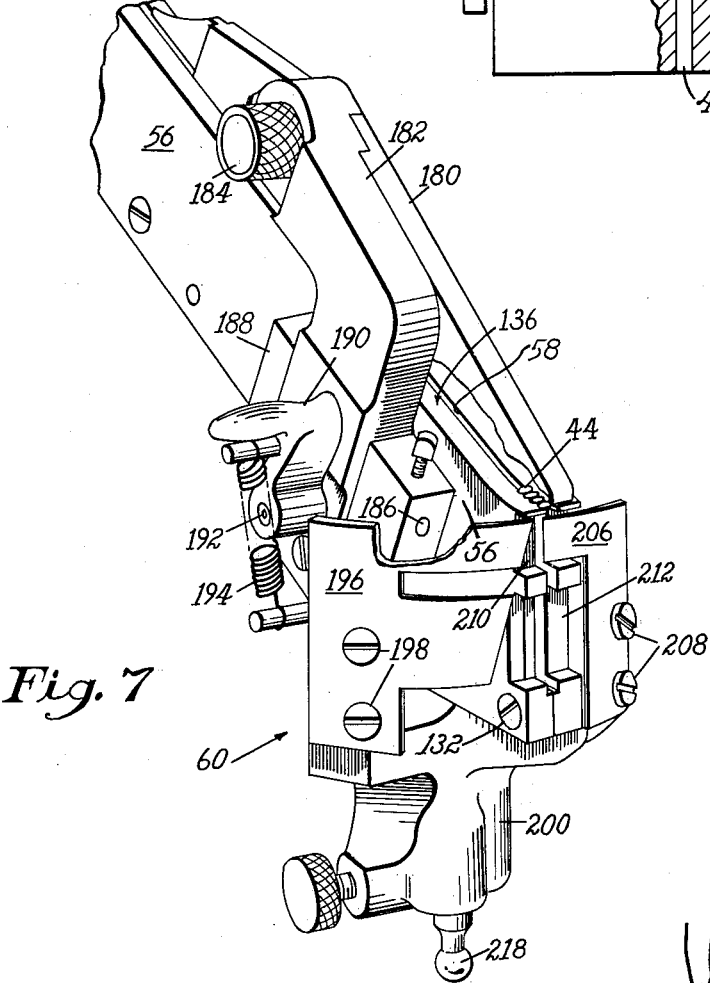
Fig. 7 is a perspective view of a raceway and an escapement unit of said nail delivering mechanism.
Figure 11:
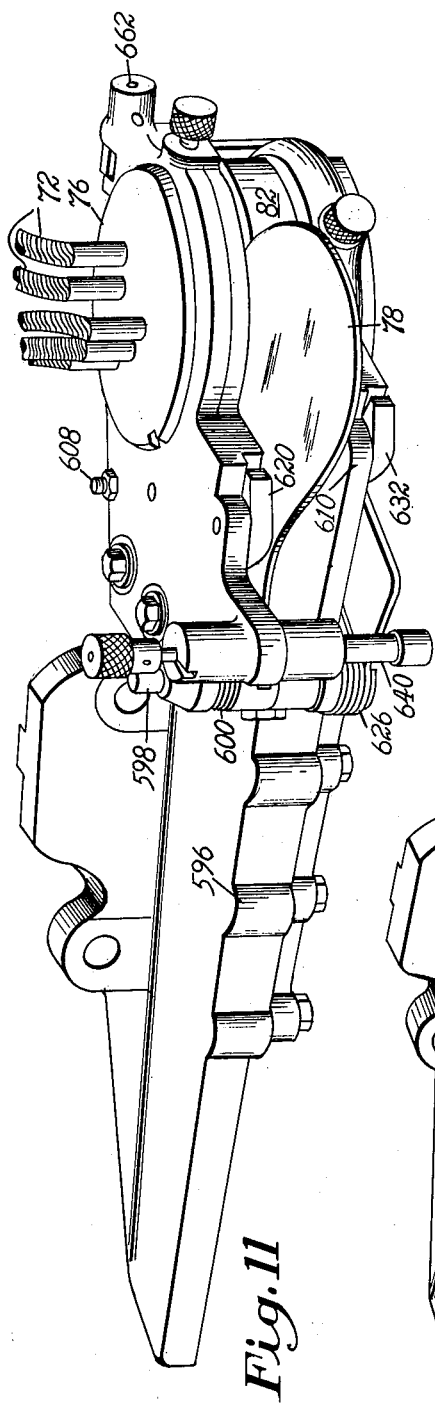
Fig. 11 is a perspective view of nail transferring mechanism comprising a loader block which is illustrated in a nail receiving position beneath a foot plate.
Figure 12:
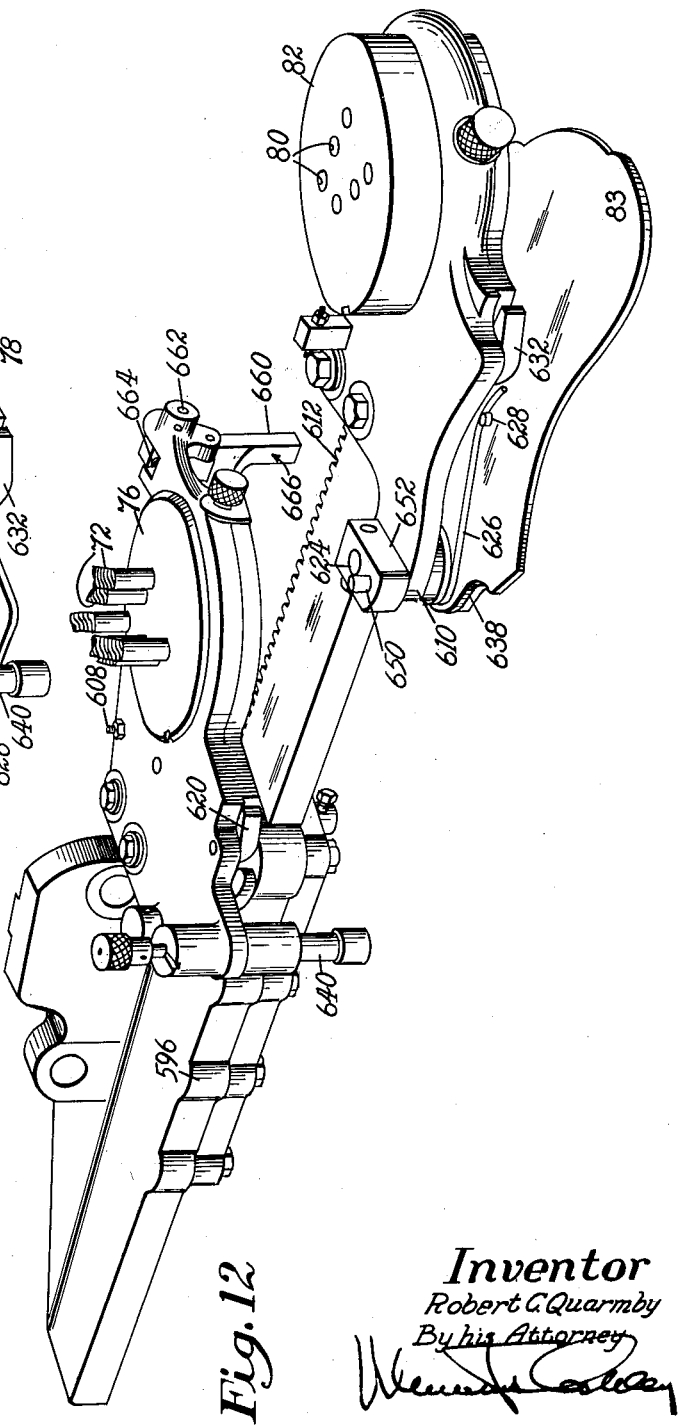
Fig. 12 is a view similar to Fig. 11 but showing the loader block in a nail delivering position.

The raceway 56 comprises two complemental halves secured together by screws 132 (Figs. 2 and 7) and having formed between them the nail receiving slot 58 down which the nails 44 from the hopper 52 pass, the heads of the nails being supported by upper faces or a combined face 136 of the raceway which is secured in a groove (not shown) of the hopper bracket by a hand screw 138 threaded into the bracket and having a tapered end portion (not shown) arranged to enter a tapered hole (not shown) in the raceway.

Above the raceway 56 is mechanism which operates the clearer 130 and is arranged to remove from the raceway nails 44 lying across the upper end of said raceway and inside the hopper 52. The nail clearer operating mechanism comprises a downwardly extending arm 140 of a clearer lever 142 (Figs. 1, 2, 17 and 18) which is pivotally mounted on a horizontal spindle 144 secured in a block 146 which is mounted on the funnel 94. The arm 140 of the clearer lever 142 has secured to it the clearer 130 the lower end portion of which is arranged just above the raceway and extends into the hopper 52 through a slot formed in the lower end of the funnel 94. The block 146 is secured to the funnel by a screw 148 which passes through a slot 150 (Fig. 17) in the block and is threaded into the funnel, and surrounding the screw and engaging the opening is an eccentric sleeve 152. The sleeve 152 has at its outer end a knurled flange 154 by which it may be rotated to raise or lower the clearer lever 142 correctly to position the clearer relatively to the raceway 56, the screw 148 serving to clamp the block 146 against the funnel 94 and the flange 154 of said sleeve against the block after the proper adjustment of said clearer has been effected.

The clearer lever 142 has an arm 156 to which is attached one end of a tension spring 158, the other end of said spring being attached to the funnel 94, said spring urging the clearer 140 inwardly of the hopper 52 and upwardly along the raceway 56. The clearer lever 142 has an arm 160 the upper end portion of which is arranged to be engaged by an adjustable screw 162 in an offset end portion of an arm 164 of a clearer cam lever 166. The lever 166 is rotatably mounted on an eccentric portion (not shown) of a spindle 168 journaled in the hopper bracket 84 and has an arm 170 (Figs. 1 and 2) carrying a cam roll 172 which is arranged to be engaged by the cams 128 of the drum portion 88 of the hopper 52 as said hopper rotates. The outer end portion of the spindle 168 has pivoted on it a handle 174 which extends laterally of the spindle and by means of which the spindle may be swung about the axis of said spindle. Secured to the hopper bracket 84 is a pin 176 which normally engages a recess 178 (Fig. 17) in a boss of the handle 174, thereby locking the handle and accordingly the spindle against movement. By swinging the handle 174 about its pivot to the spindle 168 the recess 178 may be moved away from the pin 176 thus allowing the spindle to be swung by the handle. When the handle 174 is rotated clockwise from its position shown in Figs. 2 and 17 the eccentric portion (not shown) of the spindle 168 carries the clearer cam lever 166 to the right, as viewed in Fig. 1, and moves the cam roll 172 from above the drum portion 88 of the hopper 52 so that said drum portion may be lifted from the rolls 108, 120 and 120a preparatory to changing nails in the hopper. When the clearer cam lever 166 is shifted to the right, as viewed in Fig. 2, the screw 162 in the arm 164 of the lever is moved away from the arm 160 of the clearer lever 142 sufficiently to insure that the arm 160 shall not engage the screw 162 or the arm 164 when the funnel 94 is swung upward toward its position shown in Fig. 18.

Arranged over the raceway 56 and extending from the hopper 52 to the lower end of the raceway is a raceway cover 180 secured, for up and down adjustment relatively to the top of the raceway, to a cover block 182 by a screw 184 which passes through a slot (not shown) in said block and is threaded into the cover. The cover block 182 is pivoted on a bearing pin 186 which is carried in a plate 188 screwed to the raceway and extends generally lengthwise of said raceway and parallel to the upper face of the raceway. The cover block 182 is held in an operating position shown in Figs. 2, 7, 17 and 18 by a latch 190 which is mounted for pivotal movement upon a shoulder screw 192 carried by the plate 188 and engages a face of the cover block. The latch 190 is held in an operative position by a tension spring 194 and may be swung about the screw 192 so as to be moved out of the path of the cover block 182 when the latter is swung forward about the pin 186 to carry the raceway cover 180 away from said raceway 56.

The nails 44 are removed one by one from the lower end of the raceway 56 by a nail separator 196 which forms part of the escapement 60 and is secured by screws 198 to a carrier 200 pivoted on a spindle 202 (Figs. 3 and 8) arranged below the raceway and secured in a bracket 204 fixed to the raceway 56. The escapement 60 also comprises a gate 206 which is secured by screws 208 to the carrier 200, the separator 196 and the gate 206 being of arcuate shape, as viewed from above, and in concentric relation with the axis of the spindle 202, the carrier when rotated moving in an upper slot 210 (Fig. 7) formed in the lower end of the raceway 56. The separator 196 also has a lower arcuate portion which, when the carriage 200 is oscillated about the axis of the spindle 202 by mechanism hereinafter described, moves in a lower slot 212 of the raceway 56. The rear portion of the separator 196 is wedge shaped so that when the escapement 60 is swung rearward through the slots 210, 212 formed at the lower end of the raceway 56, the wedge-shaped portion of the separator moves between the end nail in the raceway and the nail next to it. The separator 196 is so formed that as it is moved rearward it pushes the end nail out of the raceway 56 and into one of the six pockets or grooves 62 of the inverting or reversing disk 64, hereinafter described, the gate 206 at such time having been swung rearward to permit such action.

When the separator 196 has been moved forward far enough to allow the line of nails to move down the raceway 56, the gate 206 has moved against the end of the raceway and prevents the lowermost or end nail from moving out of the raceway and so positions it along the raceway that when the separator again moves rearward it will pass between said nail and the next nail to it to transfer said nail to the pocket 62. The escapement 60 comprises a ball-ended stud 218 (Fig. 8) to which is connected the upper end of a rearwardly extending multipart link 220 (Figs. 3 and 8). The link 220 is so arranged that it may yield, should the separator 196 meet an obstruction (such as a bent nail), when it is being moved rearward to separate the endmost nail from the row of nails in the raceway 56. The rear end of the link 220 is connected for universal movement to a cam lever 222 pivoted on a horizontal laterally extending stud 224 secured to the main frame 86. The cam lever 222 carries a cam roll 226 held by a spring 228 against a cam 230 on a horizontal laterally extending separator cam shaft 232, 232a rotatably mounted in the main frame 86. The multipart link 220 comprises a part 234 universally connected to the stud 218 and a part 236, universally connected to the cam lever 222, the part 236 being slidingly mounted in the part 234 and a spring 238 being interposed between said parts so that the part 236 may be moved yieldingly relatively to the part 234 if movement of the separator 196 is prevented.

The hopper bracket 84 has secured to it a platform 240 (Figs. 1, 2, 17, 18, 19, 20 and 21) which is pivoted upon a vertical bearing rod 242 secured to the main frame 86, the construction and arrangement being such that when the multipart link 220 has been disconnected from the escapement unit 60 said platform, which carries the hopper bracket 84, the hopper 52, the raceway 56, the raceway cover 180 and the escapement unit 60, may be swung out of its normal or operative position to the position in which it is shown in Fig. 20 so that the escapement unit, the inverting disk 64 and other parts hereinafter described may be readily reached for the removal of nails or for other purposes.

Figure 22:
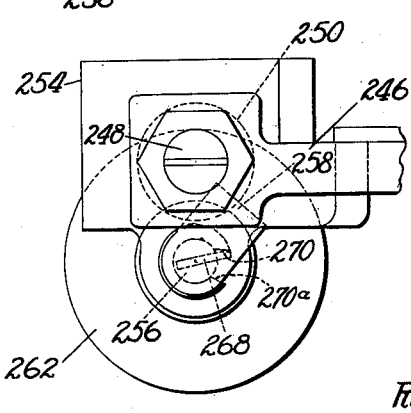
Fig. 22 is an end view on the line XXII—XXII of Fig. 19 showing means for locking the hopper in its active position to the main frame of the machine.

Projecting forwardly from and secured by screws 244 to the main frame 86 is a lug 246 in which is threaded, for purposes of adjustment, a stop screw 248 having a head 250 the end face of which, when the hopper bracket is in its operative position, is engaged by a lug 254 secured to the platform 240. The lug 254 has slidingly mounted in it a drawbolt 256 having a lateral extension 258 which is arranged to engage an inner face 260 of the head of the stop screw 248. Threaded onto the drawbolt 256 is a hand nut 262 arranged to engage a face of the lug 254 to move the extension 258 on the drawbolt against the head 250 of the stop screw 248 whereby to lock the hopper bracket 84 in operative position. The drawbolt 256 has threaded onto it a stop nut 264 and a lock nut 266, the stop nut being so adjusted relatively to the hand nut 262 that when the hand nut is rotated to loosen the locking bolt it engages the stop nut, and thereafter the hand nut and the drawbolt rotate together, thereby causing the extension 258 on the drawbolt to move away from the head 250 on the stop screw 248 so that the platform 240 and parts carried thereby may be swung about the bearing rod 242 into their inactive positions. After the hopper bracket 84 has been returned to its normal position, the hand nut 262 is rotated in an opposite direction and through friction between the hand nut and the drawbolt 256, the bolt turns with it to bring the extension 258 on said bolt into a position where it may engage the head 250 on the stop screw 248. Further rotation of the hand nut 262 clamps the lug 254 against the head 250 of the stop screw 248 to lock the hopper bracket 84 in position. Turning movement of the drawbolt 256 on the lug 254 is limited by the engagement of a pin 268 (Fig. 22) on the bolt with opposed shoulders 270, 270a on the lug.

Each nail 44 as it is separated from the nails in the raceway 56 is pushed by the separator 196 from the raceway into one of the six pockets or grooves 62 formed in a side face of the rotatable nail reversing or inverting disk 64 which turns the nails delivered to it from the raceway 56 upside down so that their points are uppermost. As viewed from the front of the machine, the inverting disk 64 is secured to the left face of a bevel gear 274 (Figs. 3 and 4) formed on a horizontal reversing shaft 276 rotatably mounted in a bearing in the main frame 86 and rotated intermittently or step-by-step by mechanism hereinafter described.

Figure 5:
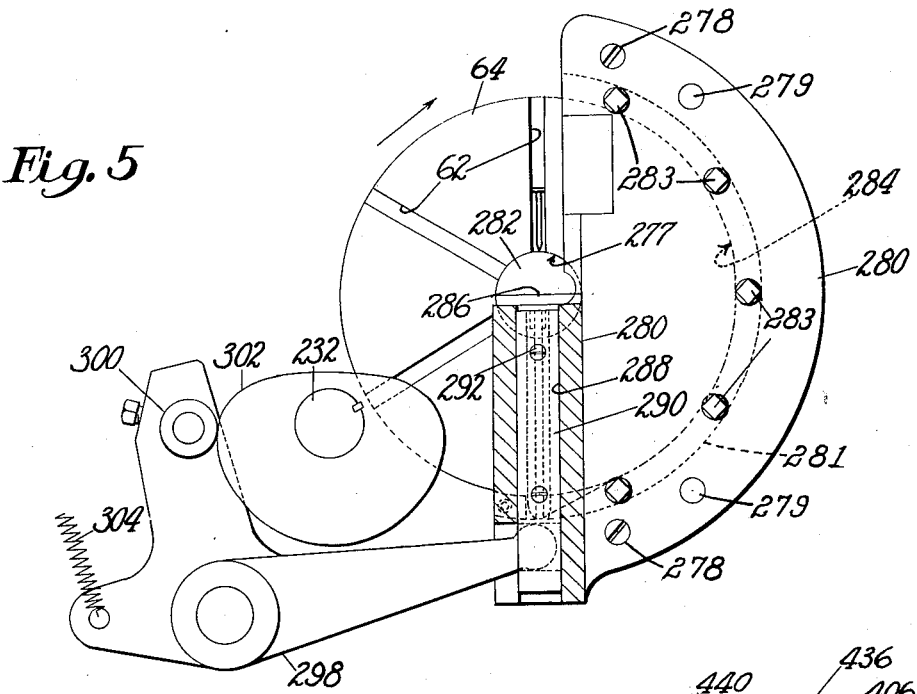
Fig. 5 is a side elevation, partly in section on the line V—V of Fig. 4, showing portions of the nail delivering mechanism.

The nail reversing disk 64, which has a cylindrical recess 277 (Figs. 4 and 5) formed at the central portion of one of its sides, is rotated clockwise, as viewed in Fig. 5, and secured by screws 278 and dowels 279 to the main frame 86 and extending nearly half way around the disk 216 is a guard 280. The guard 280 comprises a semi-cylindrical head 282, which fits in the cylindrical recess 277, and a semi-annular filler 281 secured to the main portion of the guard by screws 283, the guard being constructed and arranged to prevent the nails 44 from falling out of the pockets 62 as said nails are reversed preparatory to their being delivered into the vertically disposed frusto-conical openings 66 formed in the nail distributor 68. The head 282 of the guard 280 supports the nails 44 in the pockets 62 as they are carried around with the reversing disk 64 until such time as they slide down the pockets under the action of gravity against an arcuate surface 284 of the filler 281 of the guard 280. The six pockets 62 of the reversing disk 64 are radially disposed with relation to an axis of rotation 286 of the disk 64, and are equally spaced apart, each nail being fed into a vertically disposed pocket arranged in opposed relation to the lower end of the raceway 56 and dropping out of said raceway when the pocket has moved just past a lower beveled end of the surface 284 of the filler 281.

To insure that the nails shall be moved rapidly from the pockets 62, as they arrive successively at the bottom of the disk 64, there is mounted in a vertical guideway 288 in the guard 280 a vertical nail removing or ejecting slide 290 (Fig. 4) which is arranged just in front of said pockets as they arrive at their lowermost or discharge positions. The nail removing slide 290 has secured to it by screws 292 an ejector 294 which has a lug 296 and is arranged to be moved down and up in the lowermost pocket 62 just after the reversing disk 64 has come to rest with the pocket in its lowest position, thereby forcing or pushing a nail then in said pocket out of the pocket into the adjacent passage 66 of the nail distributor block 68. When the nail reversing disk 64 is being rotated, the lug 296 of the ejector 294 lies in the cylindrical recess 277 in the disk 64 from which recess each pocket or groove 62 extends to the periphery of the disk. The nail removing slide 290 is operated by a cam lever 298, having mounted on it a cam roll 300 which engages a cam 302 on the shaft 232, a tension spring 304 attached to the cam lever and to the main frame 86 moving the slide 290 down when allowed to do so by the cam and the slide thereafter being raised by the cam.

Secured to the right-hand end portion of the reversing shaft 276, as viewed in Fig. 3, is a Geneva wheel 306 (Figs. 3 and 9) having six radial grooves 308 each of which in turn is arranged to be engaged by a roll 310 (Figs. 9 and 10) on an actuating disk 312 secured to the shaft 232, 232a. During each revolution of the separator cam shaft 232, 232a the Geneva wheel 306, the reversing shaft 276, and the nail reversing disk 64 are rotated through one-sixth of a revolution. The shaft 232, 232a has associated with it a clutch or coupling 314 (Fig. 10) which may slip if rotation of the portion 232 of the cam shaft should be impeded. The slip coupling 314 is provided by forming on the portion 232 of the cam shaft 232, 232a a reduced end 316, which enters a bore 318 in the portion 232a of the cam shaft, a bushing 320 being interposed between said reduced end and the wall of the bore. A block 322 which is secured to the shaft portion 232a has slidingly mounted in it a spring-pressed plunger 324 an end of which engages a recess 326 in a disk 328 secured to the actuating disk 312. The shaft part 232 is driven through the plunger 324 and should the shaft portion 232 be prevented from rotating with the shaft portion 232a the plunger 324 rides out of the recess 326 in the disk 328.

The edge face of the Geneva wheel 306 (Fig. 9) has formed in it, between the grooves 308, recesses 330 each of which, as said wheel arrives at a stopping position, is concentric with an axis 332 of the separator cam shaft 232, 232a and the actuating disk 312 has formed on it a hub portion 334 which, after the Geneva wheel has moved one-sixth of a revolution, comes into engagement with a recess 330 and prevents undesirable rotary movement of the nail reversing disk 64 and accurately positions the uppermost pocket 62 in the disk 64 relatively to the lower end of the raceway 56. The separator cam shaft 232, 232a is driven through a clutch 336 (Fig. 3), hereinafter referred to, positioned at the right-hand end of said shaft.

Each nail 44, as it is pushed by the ejector 294 from one of the pockets 62 of the nail reversing disk 64, enters one of the nail receiving holes 66 in the nail distributor block 68 which is rotatably mounted on a vertical spindle 338 (Figs. 3 and 4) secured to the main frame 86. The nail distributor block 68 has extending vertically through it twenty of the nail receiving holes 66, said holes being equally spaced apart around the marginal portion of the block and upper and lower portions of the holes being of frusto-conical and cylindrical shapes respectively. The nail distributor blocks 68 has keyed to it a bevel pinion 340 rotatable on the vertical spindle 338 and meshing with the bevel gear 274. The numbers of teeth on the bevel gear 274 and on the bevel pinion 340 are such that during one-half revolution of the bevel gear, the bevel pinion revolves one and one-twentieth of a revolution. As each pocket 62 of the nail reversing disk 64 is moved through one-sixth of a revolution of said disk into a position to receive a nail from the raceway 56, six nail receiving holes 66 in the nail distributor block 68 move past their nail receiving position without receiving a nail. The next nail receiving hole 66 arrives at its nail receiving position as one of the pockets 62 of the reversing disk 64 arrives in position to receive a nail from the raceway 56 and as an oppositely disposed pocket arrives in a position to discharge a nail therefrom. This arrangement of pockets 62, nail receiving holes 66 and gearing insures that even if the maximum twenty nails are separated from the raceway only one nail will be delivered into every nail receiving hole and the gearing and nail receiving block may be more compact than if the nail receiving block were only rotated through one-twentieth of a revolution at a time and nails were delivered into the holes successively. In view of the foregoing the nails 44 may be described as being fed into a plurality of series of passages 66 in the block 68 intermittently, the nails being fed progressively into the passages of each of said series.

Below the nail distributor block 68 is a nail stop plate 342 having formed in it twenty passages or holes 344 arranged to lie beneath the twenty passages or holes 66 in the nail distributor block. The stop plate 342 has an upwardly projecting boss rotatably mounted on the spindle 338 and extending into a recess 346 in the block 68. The recess 346 is somewhat larger in diameter than the boss of the stop plate 342 and in the space between the block 68 and said boss is a torsion spring 348 having one of its ends connected to the block and its other end connected to the stop plate. The torsion spring 348 tends to turn the stop plate 342 clockwise, as viewed from above, relatively to the block 68 and movement of the plate in this direction is limited by the engagement of a pin 350 extending downward from the block with one end of a slot 352 in the plate. When in this position, the holes 66, 344 in the block 68 and in the plate 342 respectively are relatively offset so that portions of the plate between its holes prevent the nails delivered to the block from falling out of the holes of the block.

The nail stop plate 342 has formed around its edge 20 ratchet teeth 354 one of which is engaged, just before the nail distributor block 68 comes to rest after a predetermined number of nails have been delivered to the block, by a stop plate pawl 356 secured to a pivot pin 358 journaled in the main frame 86. Continued rotation of the nail distributor block 68 relatively to the stop plate 342 after the stop pawl 356 has engaged one of the ratchet teeth 354 causes the passages 66, 344 in the block and the plate to be alined so that the nails in the passages in the block fall out of said block. Beneath the nail distributor block 68 is a nail guide tube holder 360 having formed in it twenty vertically arranged holes or passages 362 which lie below the passages 66 respectively in the nail distributor block 68 so that when the passages 344 in the stop plate 342 are in alinement with the passages 66 in the nail distributor block 68 nails in said block may pass through the passages in the holder 360. The holder 360 is pivoted on a vertical rod 364 (Fig. 1) secured to the main frame 86 so that the holder may be swung from beneath the nail distributor block 68 for the purpose of replacing parts or making other repairs.

The number of nails 44 separated from the raceway 56 and delivered to the nail distributor block 68 for the attachment of the heel 40 to the shoe 42 is controlled by the above-mentioned counting mechanism 70 which is so constructed and arranged that any number of nails from two to twenty inclusive may be delivered to the distributor block 68 during each complete operation of the counting mechanism. The counting mechanism 70 is driven by a bevel pinion 366 secured, as viewed in Fig. 3, to the right-hand end of the nail reversing shaft 276. The bevel pinion 366 meshes with a bevel gear 368 mounted for rotation on a horizontal bearing or counting shaft 370 which for a purpose hereinafter explained is slidable lengthwise and is rotatable into different indexed positions in the main frame 86. The bevel gear 368 rotates one-quarter of a revolution each time the bevel pinion 366 rotates once. Rotatable about the counting shaft 370 is a ratchet 372 (Figs. 3 and 4) having twenty-four teeth, said ratchet having extending rearward from it two lugs 374, one on each side of the shaft 370, which engage in recesses 376 in the bevel gear 368 and cause the ratchet to rotate with the bevel gear, said recesses being sufficiently deep to allow the ratchet to move forward and rearward relatively to the bevel gear.

Just in front of the ratchet 372 (Fig. 3) and rotatably mounted on the shaft 370 is a spring-box 378 having a rearwardly extending sleeve 380 on which the ratchet is rotatably mounted. The spring-box 378 has formed in it a recess 382 arranged to house a coil spring 384 and in front of the spring-box and secured to the shaft 370 is an indexing member 386 which, as will be hereinafter explained, may be rotated, by the use of a hand wheel 410 (Figs. 1 to 3), into different positions to determine the number of nails to be separated from the raceway and delivered to the nail distributing block 68 during each complete operation of the counting mechanism 70. Positioned in the recess 382 (Fig. 3) and secured to the spring-box 378 is a pin 388 to which is attached one end of the coil spring 384, the other end of said spring being attached to a pin 389 extending rearward from the indexing member 386. The coil spring 384 tends to turn the spring-box 378 and the indexing member 386 clockwise and counterclockwise respectively, as viewed from the front of the machine (Fig. 2). The indexing member 386 has a forwardly projecting sleeve 390 secured to the counting shaft 370 and on said shaft and in a bracket forming part of the main frame 86 is rotatably mounted a stop plate pawl controlling member 392 (Figs. 3 and 4). The indexing member 386 has projecting forwardly from it four pins 394 spaced 90° apart about the axis 396 of the shaft 370 and these pins are arranged to enter four of twenty-four holes 398 in the pawl controlling member 392. The stop plate pawl controlling member 392 has a downwardly extending arm 400 (Figs. 2 and 4) which is connected to one end of a link 402, the other end of said link being connected to an arm 404 secured to the vertical pivot pin 358. Secured to the front end portion of the stop plate pawl controlling member 392 is a clutch controlling member 406 having an arm which is operatively connected to hereinafter described mechanism for controlling the above-mentioned clutch 336 through which the separator cam shaft 232, 232a is driven.

The front face of the clutch controlling member 406 for the counter mechanism has secured to it a dial 408 (Fig. 2) having index marks ranging from one to twenty inclusive, and in front of the dial and secured to the shaft 370 is the hand wheel 410 having a pointer 412 movable past the index marks. When the wheel 410 is pushed rearward against the action of a compression spring 414 which urges it forward, the shaft 370, the indexing member 386, the spring-box 378 and the ratchet 372 all move with it and the four pins 394 in the indexing member are disengaged from the stop plate pawl controlling member 392 so that the shaft and the indexing member may be rotated until the pointer 312 is moved around to a predetermined number on the dial 408 representing the number of nails 44 which will be delivered during a complete operation of the counting mechanism from the time it is started until it is automatically stopped.

The indexing member 386 has extending from it a lug 416 the position of which, around the axis 396 of the shaft 370, will vary in accordance with the number of nails to be counted. The spring-box 378 has extending to the left from it, as viewed from the front of the machine, a relatively short arm 418 to which is pivoted on a spindle 420 a counting pawl 422 arranged to engage teeth on the ratchet 372. The spindle 420 has formed on its front end a lug 424 and is frictionally held against rotation upon the spring-box 378.

After a predetermined number of nails have been counted and the counting mechanism has stopped, the counting pawl 422 is in engagement with one of the teeth of the ratchet 372, the reltaively short arm 418 on the spring-box 378 has engaged a flange 426 on the stop plate pawl controlling member 392 and has rotated that member so far in a counterclockwise direction, as viewed from the front, that the aforesaid stop plate pawl 356 has engaged one of the teeth on the stop plate 342, and the clutch controlling member 406, which is fixed to the pawl controlling member 392, has been moved so far as to cause the clutch 336 to open, the parts at such time being stationary. When the parts are in this stopped position a downwardly extending tail 428 of the counting pawl lies close to a pawl releasing device 430.

When the pawl releasing device 430 is actuated by mechanism hereinafter referred to, the counting pawl 422 is released from the ratchet 372 and the coil spring 384 in the spring-box 378 moves said box in a clockwise direction, as viewed from the front of the machine, until the short arm 418 on the spring-box engages the lug 416 on the indexing member 386. Just before the arm 418 of the spring-box 378 engages the lug 416 on the indexing member 386 the lug 424 on the pawl spindle 420 engages a face on the lug 416 and the counting pawl 422 is turned into engagement with the ratchet 372. As the spring-box 378 begins to move clockwise the arm 418 thereon moves away from the flange 426 on the stop plate pawl controlling member 392 and such member and the clutch controlling member 406 are moved, by a tension spring 434 connected to the clutch controlling member 406 and to the main frame 86, in a direction to cause the stop plate pawl 356 to be moved away from the teeth 354 on the nail stop plate 342 and the clutch 336 to be engaged. Movement of the stop plate pawl and the clutch controlling members 392, 406 by the spring 434 is limited by the engagement of the arm portion of the clutch controlling member 406 with an adjustable screw (not shown) in the main frame 86. When the stop plate pawl 356 is moved away from the ratchet teeth 354 on the stop plate 342, the stop plate is moved by the torsion spring 348 relatively to the nail distributor block 368 so that the passages or holes 66, 344 in the block and the plate respectively are out of alinement and nails separated during the next counting operation cannot pass out of the block.

When the clutch 336 is closed, the escapement unit 60, the nail reversing disk 64, the nail ejecting slide 290 and the nail distributor block 68 are caused to operate and the ratchet 372 of the counting mechanism is rotated, and through the counting pawl 422 drives the spring-box 378 in a counterclockwise direction, as viewed from the front of the machine, until the arm 418 thereon engages the flange 426 on the stop plate pawl controlling member 392 whereupon the stop plate pawl 356 is moved into engagement with the ratchet teeth 354 of the stop plate 342 and the clutch is disengaged. It will be understood that the spring-box 378 moves from the variable position of the lug 416 on the indexing member 386 about the axis 396 of the bearing shaft 370, which position of the lug is determined by the number of nails it is desired to separate, and that the stopping position of the spring-box is constant.

Figure 6:
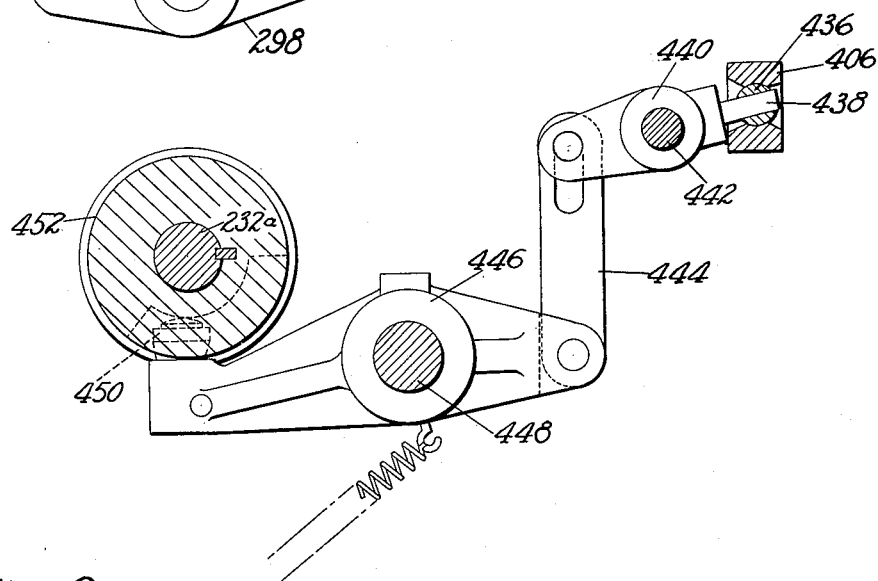
Fig. 6 is a view on the line VI—VI of Fig. 3 showing clutch controlling means for actuating said nail delivering and counting mechanism.

The arm of the clutch controlling member 406 has rotatably and slidably mounted in it a rod 436 (Figs. 3, 4 and 6) the axis of which lies radially of the bearing shaft 370. Extending through a slot in the arm of the clutch controlling member 406 and laterally through the rod 436 is a pin 438 which is secured in a forwardly extending arm of a lever 440 which is journaled on a horizontal laterally extending bearing spindle 442 secured to the main frame 86. A rearwardly extending arm of the lever 440 has pivotally connected to it the upper end portion of a link 444 the lower end portion of which is pivotally connected to the front end portion of an arm of a cam lever 446. The cam lever 446 is pivoted on a horizontal laterally extending bearing shaft 448 secured to the main frame 86, a rearwardly extending arm of the cam lever having rotatably mounted on it a cam roll 450 which lies below the cam shaft 232, 232a and the axis of which is vertically disposed. The cam roll 450 is arranged to be engaged by a suitable cam on a clutch sleeve 452 which is keyed on the separator cam shaft 232a and slides thereon.

When the cam roll 450 has been moved down away from the cam the clutch sleeve 452 is moved to the right, as viewed from above, by a compression spring 454 along the cam shaft 232a so as to move a pin 456 in the right-hand end of the clutch sleeve 452 into the path of one of two pins 458 projecting from a pulley 460 rotatably mounted on the cam shaft 232a and constantly driven while the machine is powered. When the cam roll 450 has been moved up into the path of the cam, the cam, by reason of its engagement with the cam roll, causes the clutch sleeve 452 to move to the left along the cam shaft 232a to move a brake face 462 on the clutch sleeve into engagement with a brake ring 464 secured to the main frame 86. A face of the clutch sleeve 452, which engages the cam roll 450 and enables the clutch sleeve 452 to be moved to the left, as viewed in Fig. 3, has formed in it a shallow recess (not shown) which, just as the cam shaft 232, 232a is brought to rest by the brake, is arranged opposite the roll and allows pressure of the brake to be slightly relieved.

The pulley 460 on the multipart cam shaft 232, 232a is operatively connected by a belt 466 (Figs. 3 and 24) to a loose pulley 468 (Figs. 23 and 24) on a countershaft 470 rotatably mounted in a bracket which is adjustably secured to and may be considered part of the main frame 86. The countershaft 470 has secured to it a pulley 472 which is driven by a belt 474 operatively connected to a motor (not shown). The loose pulley 468 may be connected to the driving pulley by a clutch 476 which is controlled by a hand lever 478 so that the nail counting mechanism may, if desirable, be prevented from operating while the rest of the machine is being operated. The loose pulley 468 has secured to it a pinion 480 meshing with a gear 482 secured to the countershaft 118. The countershaft 118 also has secured to it a sprocket wheel 484 which, through a chain 486 (Figs. 16, 23 and 24), drives a countershaft 488 (Fig. 16) which is rotatably mounted in the main frame and has secured on it a bevel gear 490 which meshes with a bevel gear 492 secured to the upper end portion of a sleeve 494 rotatably mounted in the main frame. A vertical shaft 491 (Figs. 15 and 16) is rotatably mounted in the sleeve 494 and in bearings in the main frame 86. The sleeve 494 has secured to it a bevel gear 496 meshing with a bevel gear 498 which is secured to a horizontal idler shaft 500 rotatably mounted in the main frame 86 and which meshes with a bevel gear 502 of the same size as the bevel gear 496. When the loose pulley 468 on the countershaft is clutched to the driving pulley 472 the countershafts 118 and 488 as well as the vertical shaft 491 are driven.

Splined on the vertical shaft 491 and movable axially thereof is a clutch member 504 having on its upper and lower portions teeth 506, 506a which are arranged to interlock with teeth 508, 510 respectively of the bevel gears 496, 502 so that the vertical shaft 491 may be driven in one direction or the other. The clutch member 504 is controlled by a bifurcated clutch arm or member 512 which is secured on a vertical clutch controlling shaft 514 the upper end portion of which is slidingly mounted in a clutch bracket 516 secured to the main frame 86. The bifurcated clutch arm 512 engages a groove 518 extending around the mid portion of the clutch member 504. The lower end portion of the clutch controlling shaft 514 is slidingly mounted in a bore 520 extending lengthwise of a second shaft 522 slidingly mounted in the clutch bracket 516. The clutch control shaft 514 has extending upwardly from its lower end a central bore 524 in which is housed a compression spring 526 the upper end of which engages the upper end of the bore and the lower end of which engages a pin 528 secured in the second shaft 522 and passing through a slot 530 in the clutch control shaft 514, the spring 526 normally holding the lower end of the slot 530 against the pin 528.

The clutch arm 512 has journaled on its trunnions of a latch 532 which has a hook 534 arranged to engage beneath a hook 536 formed on a latch plate 538 which is secured to and may be considered part of the clutch bracket 516. Pivotally connected to the arm 512 is a latch rod 540 which is guided in bores of the clutch bracket 516, a compression spring 542 being interposed between a lug of said bracket and a collar 544 pinned to the latch rod. The compression spring 542 urges the latch rod 540 downward and the hook 534 on the latch 532 toward the latch plate 538, the lower end of the latch rod normally lying just above a laterally extending lug 546 on the shaft 522.

The shaft 522 has on its lower end portion a downwardly facing shoulder 548 which is arranged to be engaged by the upper end of a starting pawl 550 (Figs. 15, 16, 25 and 26), the lower end portion of which is pivoted to one arm of a trip lever 552 on a spindle 554 rotatably mounted in the main frame 86. The upper end of the starting pawl 550 is urged, by a compression spring 556, arranged between the pawl and a lug 558 on the trip lever 552, toward the shaft 522. A tension spring 560, opposite ends of which are connected to the main frame 86 and to an arm 562 secured to the spindle 554, tends to move the trip lever 552 counterclockwise, as viewed in Fig. 26, and the starting pawl downward. The trip lever 552 has a second arm which has secured to it a wear plate 564 arranged to be engaged by a lug 566 secured to and forming part of a locking lever 568 which is secured to a fulcrum pin 570 journaled in the main frame 86 and which, by the action of a spring 572, normally prevents movement of the trip lever 552 in a counterclockwise direction, as viewed in Fig. 27. A third arm 574 of the trip lever 552 extends along a portion of said lever and into the main frame 86. The locking lever 568 is rotated counterclockwise to move the lug 566 on the locking lever away from the flange 564 of the trip lever 552 by a part 576 of the illustrative heel attaching machine which moves during operation of the machine when power pressure is being applied to a heel and to the shoe and corresponds to rod 70 of the fastener supplying machine disclosed in United States Letters Patent No. 1,953,250, granted April 4, 1934, on an application filed in the name of Wilfred T. Minett. The arm 574 of the trip lever 552 is actuated by a part 578 which corresponds to part 65 disclosed in said Patent No. 1,953,250 and which is moved downward when the operator releases a treadle of the machine after a heel attaching operation.

The vertical shaft 491 has freely mounted on its lower end portion a toothed pinion 580 (Figs. 13 and 15) which corresponds to the toothed pinion (35) disclosed in said Patent No. 1,953,250 and which is driven through a spring-pressed friction disk 582 rotatable with the shaft and, when excessive opposition is encountered, turns idly on the vertical shaft. The pinion 580 drives, through mechanism hereinafter described, the loader block 82 which corresponds to the loader block 36 which is disclosed in said Letters Patent No. 1,953,250. The spindle 554 on which the trip lever 552 is secured also has secured to it an arm 584 (Figs. 25 and 26) which is connected by an upwardly extending link 586 to the pawl releasing device 430.

When the illustrative machine is in its stopped position illustrated in Fig. 15 the clutch member 504 is in a mid or neutral position out of engagement with its associated beveled gears 496, 502, the clutch arm 512 is spaced slightly from the clutch bracket 516, the lower end of the second shaft 522 is resting on a high part 588 (Figs. 15 and 16) of the upper face of a cam 590 secured to the vertical shaft 491, the hook 534 on the latch 532 is out of latching engagement with the hook 536 on the latch plate 538 and is pressed against the side of said hook so that when moved downward it will move into a position beneath the hook 536, the upper end of the starting pawl 550 extends a little higher than the shoulder 548 on the shaft 522 and is pressed against the side of said shaft, the bottom of the slot 530 in the vertical clutch actuating shaft 514 is in engagement with the pin 528 in the shaft 522, and the locking lever 568 is in a position to prevent movement in a counterclockwise direction, as viewed in Fig. 27, of the trip lever 552 by its spring 560.

When, during the operation of the illustrative machine in the attachment of the heel 40 to the shoe 42, power pressure is applied to the work preparatory to the driving of heel attaching nails through the heel seat portion of the shoe and into the heel, the lug 566 on the locking lever 568 is moved from above the flange 564 on the trip lever 552 and said trip lever is moved by its spring 560 in a counterclockwise direction as viewed in Fig. 26. This movement of the trip lever 552, carries the upper end of the starting pawl 550 a little below the shoulder 548 on the shaft 522 and the spring 556 causes the pawl to swing its upper end beneath the shoulder 548. When the treadle (not shown) of the machine is released after the heel attaching operation, the arm 574 is engaged by the part 578 of the machine and is moved in a clockwise direction (Fig. 26) thereby. When the trip lever 552 is thus moved in a clockwise direction, as viewed in Fig. 26, the starting pawl 550 engages the shoulder 548 on the shaft 522 and moves said shaft, the clutch controlling shaft 514 and the clutch arm 512 upward, thereby moving the teeth 506 of the clutch member 504 into interlocking engagement with teeth 508 of the upper bevel gear 496, the clutch member being moved upward yieldingly through the spring 526 in the clutch controlling shaft 514. The vertical shaft 491 is thus driven in a counterclockwise direction, as viewed from above, through about 340° to move the loader block 82 forward to its nail delivering position with nails therein over the nailing die 46. As the vertical shaft 491 rotates in this direction the high part 588 of the cam 590 moves from beneath the shaft 522 and just as the shaft 491 completes its rotary movement in this direction a projection 592 on the edge face of the cam 590 swings the starting pawl 550 outward from beneath the shoulder 548 of the shaft 522. The clutch controlling shaft 514 and the shaft 522 then drop until the lower end of the shaft 522 engages the upper face of the cam 590 as shown in Fig. 16. This movement of the shaft 522 brings the teeth 506a of the clutch member 504 into interolcking engagement with the teeth 510 of the lower bevel gear 502 to cause the vertical shaft 491 to be rotated in the opposite, or clockwise, direction as viewed from above and the loader block 82 to be slid back into nail receiving position below the foot plate 76. As the shafts 514, 522 move downward, the hook 534 on the latch 532 will move down below the hook 536 on the latch plate 538 and will be moved by the spring 542 beneath the hook on said latch plate.

As the vertical shaft 491 approaches its original or stopping position the high part 588 of the cam 590 travels beneath the lower end of the shaft 522 and raises such shaft and the clutch controlling shaft 514 to carry the clutch member 504 toward its neutral position. As the shafts 514 and 522 are raised by the high part 588 of the cam 590 the hook 534 on the latch 532 engages the hook 536 on the latch plate 538 and arrests upward movement of the clutch controlling shaft 514. Continued upward movement of the shaft 522 relatively to the clutch controlling shaft 514 compresses the spring 526 in the clutch controlling shaft and a spring 594 which constantly urges the shaft 522 downward. As the shaft 522 is thus moved upward the pin 528 therein leaves the bottom end of the slot 530 in the clutch controlling shaft 514 and the laterally extending lug 546 on the shaft 522 engages and moves upward the rod 540 which is connected to the latch 532 so that the hook 534 on said latch is withdrawn from the hook 536 on the latch plate 538. As soon as the hook 534 on the latch 532 is withdrawn from the hook 536 on the latch plate 538 the spring 526 in the clutch controlling shaft 514 moves that shaft upward until the lower end of the slot 530 in the clutch controlling shaft engages the pin 528 in the shaft 522, the lower end of the shaft 522 being held against the high part of the cam 590 by the spring 594. The clutch member 504 is, therefore, moved toward neutral position by the high part 588 of the cam 590 and is given a relatively small further movement in the same direction to insure that it will be clear of the teeth 510 of the rotating lower bevel gear 502, the final position of the clutch member 504 being determined by the engagement of the lower end of the slot 530 with the pin 528 and engagement of the lower end of the shaft 522 with the high part 588 of the cam 590.

At the same time that the loader block 82 is operated, the pawl releasing device 430 is actuated to release the counting pawl 422 from the ratchet 372 of the counting mechanism and the coil spring 384 in the spring-box 378 causes the spring-box to move in a clockwise direction, as viewed from the front of the machine, until the lug 424 on the pawl spindle 420 comes into engagement with the lug 416 on the indexing member 386 and the short arm 418 on the spring-box engages said lug and, as hereinafter described, the clutch 336 of the counting mechanism is closed and the counting mechanism, nail escapement unit 60 and the nail reversing disk 64 begin to count another set of nails and to apply them to the nail distributor block 68.

The upper ends of the nail tubes 72, the number of which corresponds to the number of nails to be driven through the heel seat of the shoe 42 and into the heel, are inserted into suitable holes in the holder 360 and the lower ends of the tubes are inserted into the vertical passages 74 in the foot plate 76 which forms part of nail transfer mechanism of the machine. The foot plate 76 which is secured in a transfer bracket 596 (Figs. 1, 11, 12, 13 and 14) secured to and forming part of the main frame 86 may be replaced by other foot plates having different designs of passages 74.

Just beneath the foot plate 76 (Figs. 13 and 14) is the shutter 78 which is pivotally mounted upon a vertical pin 598 secured in the bracket 596 of the main frame 86. When the shutter 78 lies in a closed position beneath the foot plate 76, nails are prevented from dropping from the passages 74 of said plate and when the shutter is in an open position swung away from said plate, nails therein may fall from the plate. The shutter 78 is constantly urged from its closed or nail retaining position beneath the foot plate by a torsion spring 600 which surrounds the pin 598 and opposite ends of which bear against studs 602, 604 secured to the bracket 596 and to the shutter 78, the shutter being held in its nail retaining position beneath the foot plate by a latch 606 pivoted on a bearing pin 608 secured to the bracket 596.

Beneath the foot plate 76 is the loader block 82 which has formed in it the nail receiving passages 80 arranged in a pattern or design identical with the pattern or the design of the passages 74 formed in the foot plate and which is changed when the foot plate is changed. The loader block 82 is secured in a transfer slide 610 which is slidingly mounted in the bracket 596 and has a rack 612 meshing with the pinion 580, said pinion being actuated through the spring-pressed friction disk 582 and the vertical shaft 491 to move the loader block yieldingly over the nailing die 46 and to return it to a retracted or rest position beneath the foot plate.

Figure 14:
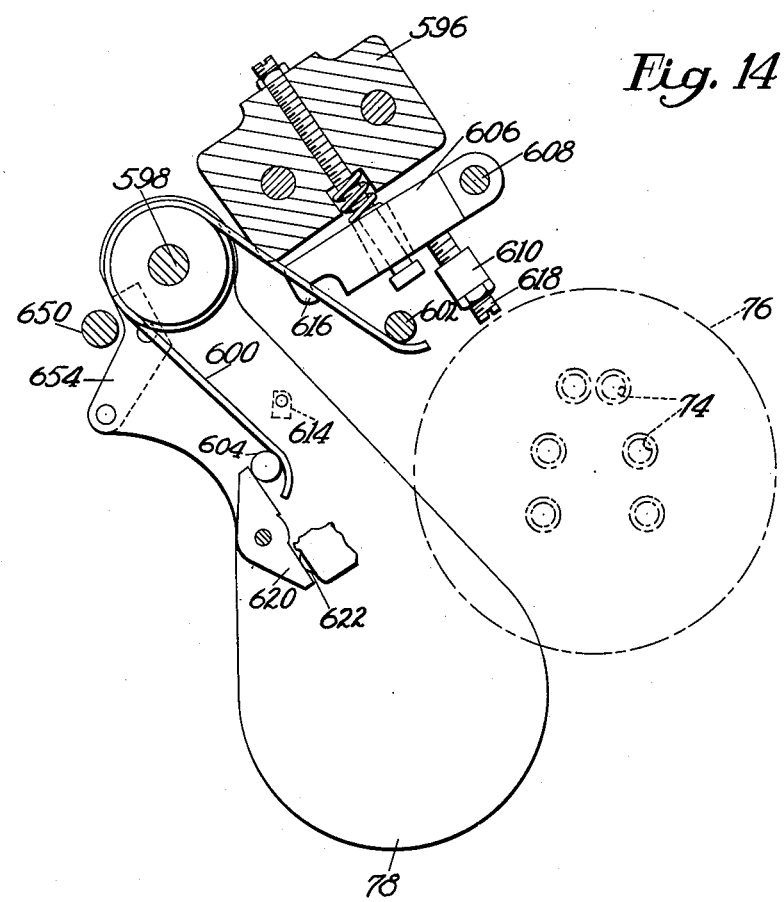
Fig. 14 is a view, partly broken away and partly in section, showing portions of the nail transferring mechanism.
Figure 19:
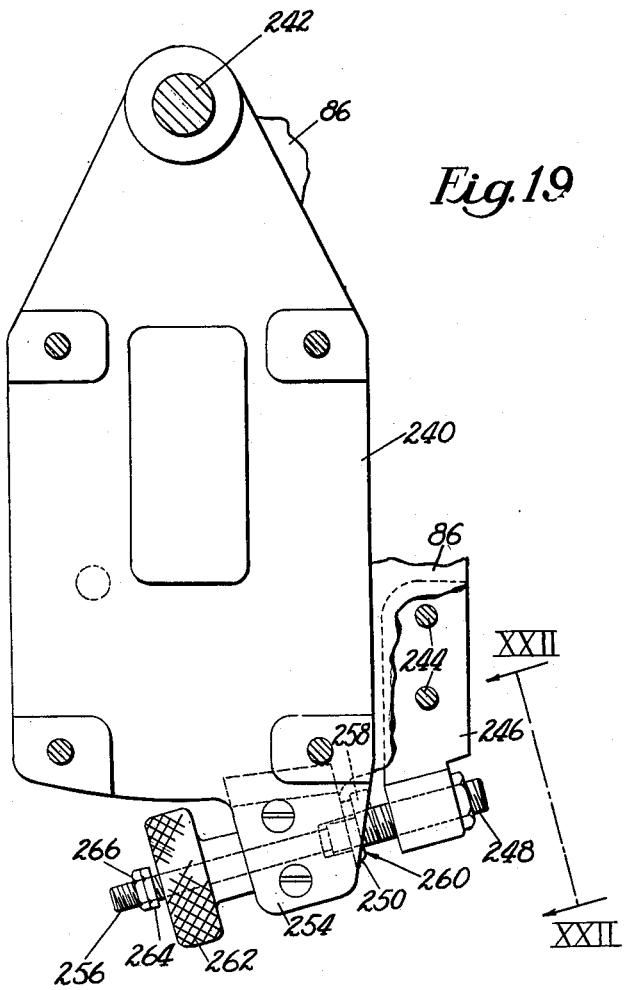
Fig. 19 is a section on the line XIX—XIX of Fig. 2 showing a platform for supporting the hopper, said hopper being illustrated in an active position.

Secured to and extending downward from the shutter 78 (Figs. 13 and 14) is a stud 614 which is engaged by a hook portion 616 of the latch when said shutter is swung counterclockwise, as viewed in Fig. 14, by means hereinafter described to its closed or nail retaining position. An adjustable screw 618 carried by the transfer slide 610 is arranged to engage the latch 606 and to release it from the stud 614 just as said slide reaches its rearmost position and the loader block 82 arrives beneath the foot plate 76. When the stud 614 is released from the latch 606 the shutter 78 is swung from beneath the foot plate 76 to its position shown in Fig. 14, and nails then in the passages 74 of the foot plate 76 fall into the loader block 82, the shutter 83 then lying in a closed or nail retaining position beneath the loader block and supporting the nails in said block. Movement of the shutter 78, when it is swung from beneath the foot plate 76 by its associated spring 600, is limited by the engagement of the stud 604 on the shutter with a yielding stop 620 which is pivotally mounted on the bracket 596 and is constantly urged clockwise, as viewed in Fig. 14, by a spring-pressed plunger 622 carried by the bracket.

The shutter 83 is secured to a pivot pin 624 rotatably mounted in the transfer slide 610 and is withdrawn from a closed position beneath the loader block 82 by a torsion spring 626 which surrounds the pivot pin 624 and has its opposite ends in engagement respectively with a shoulder of the slide and with a stud 628 in the shutter. Movement of the shutter 83 away from its closed position by the action of the spring 626 is limited by the engagement of a cylindrical stud 630 secured to the plate with a yielding stop 632 which is journaled on a pin 634 carried by the transfer slide 610 and which is constantly urged clockwise, as viewed in Fig. 13, by a spring-pressed plunger 636 slidable in the slide. The shutter 83 has formed on its rear edge a cam 638 which, when the transfer slide 610 is approaching its rearward or retracted position shown in Fig. 11, engages and travels past a vertical stud 640 secured in the bracket 596. The engagement of the cam 638 with the stud 640 causes the shutter 83 to be swung beneath its associated loader block 82, said shutter being held in this position by the engagement of a latch 642, which is pivoted on a bearing pin 644 secured to the transfer slide 610, with a block 646 on the stud 630 which is secured to the shutter 83. As the transfer slide 610 moves forward an adjustable nut (not shown), on the rear end of a rod 648 extending lengthwise of the slide and pivotally connected to the latch 642, engages the transfer bracket 596 and just as the transfer slide arrives at the forward end of its stroke and the loader block 82 arrives above the nailing die 46 the latch 642 is caused to be moved rearward about its bearing pin 644 and releases the block 646 carried by the shutter 83, said shutter being immediately swung from beneath the loader block and nails thereon falling from the passages 80 in said block into the passages 50 of the nailing die 46. The latch 642 is shown in this rearward position in Fig. 13 and as soon as the transfer slide 610 moves rearward the latch 642 is moved forward by a spring (not shown) at the rear end of the rod 648 into position to be again engaged by the block 646.

As the transfer slide 610 moves forward a pin 650 (Figs. 12, 13 and 14), secured in a block 652 on the spindle 624 to which the shutter 83 is secured, engages a laterally projecting portion 654 of the shutter 78 and swings that shutter inward beneath the foot plate 76 until it is held there by the latch 606. The pin 650 thereafter moves forward with the transfer slide 610. As the transfer slide 610 moves rearward the shutter 83 is swung out from beneath the loader block 82 and the pin 650 is then in a position to miss the projection 654 on the shutter 78 and to move rearward of it. When the latch 606 of the shutter 78 is released said shutter swings outward from beneath the foot plate 76 and the projection 654 moves once more into the path of the pin 650.

When the transfer slide 610 is in its rearward nail receiving position the shutter 78 will be withdrawn from beneath the foot plate 76 and the shutter 83 will be beneath the loader block 82 nails having fallen from the foot plate into the loader block and being retained therein by the shutter 83. As the transfer slide 610 moves forward the shutter 78 is moved beneath the foot plate 76 and is latched in position. As the loader block 82 arrives over the nailing die 46 the shutter 83 is unlatched and is swung by the spring 626 from under the loader block so that the nails therein may fall into the nailing die.

As the transfer slide 610 approaches its rearward position the shutter 83 is moved beneath the loader block 82 and just as the slide arrives in its rearward position, the latch 606 which is holding the shutter 78 beneath the foot plate 76 is released and is swung from beneath said plate by its associated spring 600. With the above arrangement, should the counting mechanism 70 finish counting the desired number of nails and these nails be allowed to pass from the distributor block 68 before the nail transfer slide has reached its rearward position, said nails will fall into the foot plate 76 and be retained there until the transfer slide 610 reaches its rearmost position at which time the nails will fall into the loader block 82.

Should the transfer slide 610 be prevented from moving fully forward, for example by the presence of a shoe on the nailing die 46, and moved rearward without the nails in the loader block 82 having been discharged into the nailing die, these nails would be carried back and would prevent nails which have been delivered to the foot plate 76 from falling into the passages 80 of the loader block 82. To cause, in such a case, the nails which are being carried back in the loader block 82 to fall from said block before the block arrives beneath the foot plate 76, the latch 642 has slidingly mounted on it a rod 656 which is urged to the left, as viewed in Fig. 13, by a spring 658. When the shutter 83 is latched beneath the loader block 82 the left-hand end of the rod 656 is engaged by the block 646 and the rod has been moved to the right, as viewed in Fig. 13, so that its right-hand end portion projects so far from the latch 642 that as the transfer slide 610 moves rearward it engages the front face of a pawl 660 then in its position shown in Fig. 12, and as the transfer slide continues to move rearward the latch is swung about its pivot and is released from the cylindrical stud 630, the shutter 83 being swung from beneath the loader block 82 and the nails therein dropping out. The pawl 660 is mounted upon a bearing pin 662 secured to the bracket 596 and is normally urged to its active position, shown in Fig. 12, and determined by a stop 663, by a spring 664. When the slide 610 moves forward with the shutter 83 latched below the loader block 82 the right-hand end of the rod 656 engages a bevel face 666 of the pawl 660 and the rod snaps past the pawl.

The transfer mechanism illustrated in Figs. 11 to 14 is claimed in a divisional application Serial No. 551,654, filed December 7, 1955, in my name.

Having thus described my invention, what I claim as new and desire to secure by Letters Patent of the United States is:

1. In a nail distributor, a raceway down which nails slide, a separator, a nail inverting member having a plurality of pockets into which the nails in the raceway are successively forced by the separator, a distributor block having a plurality of passages, means associated with said member for retaining the nails in the pockets of said member as said pockets move successively from the raceway to a discharge position above and into alinement with the passages respectively of the distributor block, an ejector for successively striking the ends of the nails in the pockets of the nail inverting member, as said pockets arrive at their discharge position, to transfer said nails lengthwise into the passages respectively of the distributor block, counting mechanism which may be set in different adjusted positions, and means for operating the separator through cycles and for moving the nail inverting member and the distributor block step by step, the number of cycles of the separator and the number of the steps of the member and the distributor block being determined by the setting of the counting mechanism to cause the nails to be delivered successively to the passages of the distributor.

2. In a nail distributor, a raceway down which nails hanging by their heads slide, an escapement unit, a nail inverting disk rotatable about a horizontal axis and having a plurality of pockets which are open at one side of the disk and which extend lengthwise to the periphery of the disk and into which nails in the raceway are forced successively by the escapement unit, a distributor block rotatable about a vertical axis and having a plurality of circumferentially spaced passages extending generally vertically through the block, means for oscillating the escapement unit and for rotating the disk and the block step by step in timed relation, means associated with the disk for retaining the nails in the pockets of the disk during rotation of said disk and for causing said nails to be delivered successively, during rotation of the disk, to a discharge position in which the pockets and accordingly the nails in them are arranged over and in longitudinal register with the passages respectively of the block, an ejector movable lengthwise of said pockets in the discharge position, and means operative in timed relation with the disk and the distributor block for moving said ejector lengthwise of said pockets in the discharge position to cause said ejector to strike the ends of the nails in the pockets as they arrive successively at the discharge position thereby transferring said nails lengthwise into the passages of the distributor block.

3. In a nail distributor, a raceway, a nail inverting member rotatable about a horizontal axis and having a plurality of radial pockets for receiving respectively nails from the raceway, a rotatable distributor block having a plurality of vertically disposed circumferentially spaced passages for receiving nails from the inverting member, means associated with the inverting member for retaining nails in said pockets as the pockets of said member are moved successively from the raceway to a discharge position above and in alinement with the passages respectively of the distributor block, an ejector slide for successively striking the ends of nails in said pockets of the disk, as said pockets arrive at their discharge position, and for transferring said nails lengthwise into the passages respectively of the distributor block, counting mechanism which may be set in different adjusted positions, means for moving the separator through a plurality of cycles and the inverting member and the distributor block through a plurality of steps, the number of which cycles and steps is determined by the setting of the counting mechanism, to deliver nails to the passages of the block, and means for rotating the inverting member and the block in timed relation with said counting mechanism, the construction and arrangement being such that nails, the number of which is controlled in accordance with the setting of said counting mechanism, are fed into a plurality of series of passages in the block intermittently, said nails being fed progressively into the passages of each of said series.

4. In a nail distributor, a raceway having a passage for receiving a line of nails which hang by their heads on the raceway, a separator, a nail inverting disk rotatable about a horizontal axis and having a plurality of radially extending pockets which are open at one side of the disk and into which nails in the raceway are forced successively by the separator, a distributor block rotatable about a vertical axis and having a plurality of passages which are circumferentially spaced about said axis and extend vertically through the block, means associated with said disk for retaining the nails in the pockets of the disk as said pockets during rotation of the disk move successively from the raceway to a discharge position above and into alinement with the passages respectively of the distributor block, an ejector for successively striking the ends of the nails in the pockets of the nail inverting disk, as said pockets arrive at their discharge position, and for transferring said nails lengthwise into the passages respectively of the distributor block, counting mechanism which may be set in different adjusted positions, and means for operating the separator through cycles and for moving the nail inverting disk and the distributor block step by step, the number of cycles of said separator and the number of steps of said disk and the distributor block being determined by the setting of the counting mechanism to cause the nails to be delivered successively heads down into the passages of the distributor block.

5. In a nail distributor, a raceway, means for supplying nails to the raceway, a nail inverting disk having pockets, means for rotating said disk to move said pockets intermittently into opposed relation to the raceway, an escapement unit for forcing the lowermost nail in the raceway into one of said pockets which is in opposed relation to the raceway, a distributor block having a plurality of passages, means for alining in longitudinal relation one of the passages of said block with another pocket of the disk when said one pocket of the disk is in opposed relation to the raceway, a slide movable successively into the pockets of said disk as said pockets move into alinement with the passages respectively of the distributor, and means operative in timed relation with the disk and the distributor for moving the slide into said pockets to cause it to strike the ends of the nails in said pockets thereby moving the nails lengthwise into said passages.

6. In a nail distributor, a raceway, means for supplying nails to the raceway, a nail inverting member having radially disposed pockets, means for rotating said member to move said pockets intermittently into opposed relation to the raceway, means for forcing nails in the raceway into pockets of said member which are arranged in opposed relation to the raceway, a rotatable distributor block having a plurality of passages, means for rotating the inverting member and the distributor block in timed relation to cause one of the passages of the block to be positioned below and in longitudinal alinement with one of the pockets of said member when another of said pockets is in opposed relation to said raceway, a slide which is movable radially of the inverting disk in the pockets of said disk as the pockets move into alinement with the passages respectively of the distributor, and means operative in timed relation with the disk and the distributor for moving the slide lengthwise of said pockets causing it to strike the ends of said nails in said pockets and thus to move them lengthwise into said passages, the construction of said last-named means being such that nails are delivered from successive pockets of the inverting member to successive series of passages of the distributor block and in succession to the passages of each of said series.

7. In a nail distributor, an inclined raceway, means for supplying nails to the raceway, a nail inverting disk rotatable about a horizontal axis and having pockets which are radially arranged with relation to said axis, means for rotating said disk to move said pockets intermittently into opposed relation to a lower end of said raceway, means for intermittently forcing end nails in the raceway into pockets respectively which are arranged in opposed relation to said raceway, a rotatable nail distributor block having a plurality of passages, means for rotating the disk and the block in timed relation and for intermittently stopping the disk and the block with one of the pockets of the disk above and in longitudinal alinement with one of the passages of the block, a powered slide movable radially of the inverting disk in the pockets of said disk as said pockets move into alinement with the passages respectively of the distributor block, and means operative in timed relation with the disk and the distributor block for moving the slide lengthwise of said pockets causing it to strike the ends of said nails in said pockets to move them lengthwise into said passages.

8. In a nail distributor, a raceway, means for supplying nails to the raceway, a nail inverting disk rotatable about a horizontal axis and having radial pockets and a side face in which is formed a cylindrical recess concentric with relation to said axis, said pockets being open at said side face of the disk and having opposed ends open respectively at a periphery and at the recess of said disk, a guard which overlies portions of said side face and said periphery of the disk and which fits in an upper half of said recess, a rotatable distributor block having a plurality of passages, mechanism for intermittently rotating the disk and the distributor block to move the pockets of the disk successively into opposed relation to a lower end of the raceway and for stopping the disk with one of its pockets arranged above and in longitudinal register with one of the passages of the block, escapement means for intermittently forcing end nails in the raceway into the pockets respectively which are arranged in opposed relation to the raceway, means for moving the disk and the block in timed relation and for intermittently stopping the disk with one of its pockets in register with one of the passages of said block, a slide which is movable in the lower half of the cylindrical recess and is movable radially of the inverting disk in the pockets of said disk as the pockets move into alinement with the passages respectively of the distributor block, and means operative in timed relation with the disk and the distributor block for moving the slide in said pockets causing it to strike the ends of the nails in said pockets thereby moving them lengthwise into said passages.

9. In a nail distributor, a nail hopper, a raceway for receiving nails from the hopper, a distributor block, a transfer unit, and an escapement unit for forcing nails intermittently from the raceway into the transfer unit, said transfer unit comprising means for delivering nails received from the raceway to the distributor block, said hopper, raceway and escapement unit being movable together as a unit between operating positions, in which the raceway is positioned adjacent to and in opposed relation to the transfer unit, to inactive positions in which the raceway is located a substantial distance from said transfer unit.

10. In a nail loader, a raceway for receiving nails, a distributor block having nail receiving passages, a nail inverting disk having pockets, an escapement unit for forcing nails intermittently from the raceway into the pockets of the disk, counting mechanism, and means for moving yieldingly in timed relation the disk and the block step by step to deliver from the disk nails to a number of said passages of the block determined by said counting mechanism, said means comprising a slide for forcing said nails from the pockets of the disk and into the passages of the block.

11. In a nail distributor, an escapement unit, a distributor block having passages, a disk having pockets and adapted to transfer in inverted relation nails, which are successively delivered by the escapement unit from the raceway to said pockets, to the passages of the distributor block, a stop plate having passages, a spring for constantly urging said stop plate to a closed position with relation to the distributor block in which position the passages of the plate are out of register with the passages of the block, a pawl associated with the stop plate for holding said plate against the action of the spring in an open position in which the passages of the block are in alinement with the passages of the stop plate, a powered drive, a clutch engagement of which effects operation of said drive and disengagement of which causes operation of said drive to cease, counting means, said counting means comprising an adjustable index member and a spring-box, a spring yieldingly connecting the index member to the spring-box, a ratchet and pawl connection between the spring-box and index member, a control member having an abutment for limiting movement of the spring-box in one direction and the index member having an abutment for limiting movement of the spring-box in an opposite direction, and means for rendering said pawl and ratchet effective to release the spring-box for movement with relation to the index member to enable the spring-box to move under the action of its associated spring against the abutment of the index member and for causing the control member to move the pawl away from the stop plate thereby enabling said plate to move to its closed position and also to effect engagement of said clutch whereby to cause the separator to move through a predetermined number of cycles and to cause the reversing disk and the distributor block to move through a predetermined number of steps depending upon the setting of the index member, said spring-box being movable against the abutment of the control member, when nails have been delivered to a predetermined number of passages of the distributor block, to disengage the clutch for stopping operation of the counting means and to move said pawl against the stop plate so that upon movement of the distributor block its passages are moved from register with the passages of the stop plate.

References Cited in the file of this patent

UNITED STATES PATENTS

| Number | Name | Date |
|---|---|---|
| 329,449 | Goddu | Nov. 3, 1885 |
| 423,921 | Gooding | Mar. 25, 1890 |
| 1,398,027 | Kelly | Nov. 22, 1921 |
| 1,839,853 | Lawson | Jan. 5, 1932 |
| 2,069,277 | Cocozella | Feb. 2, 1937 |
| 2,082,852 | Standish | June 8, 1937 |
| 2,365,060 | De Wolfe | Dec. 12, 1944 |
| 2,611,896 | Chmelar | Sept. 30, 1952 |

FOREIGN PATENTS

| Number | Country | Date |
|---|---|---|
| 23,356 | Great Britain | Oct. 29, 1904 |